United States Patent
Badr et al.

(10) Patent No.: US 11,436,417 B2
(45) Date of Patent: *Sep. 6, 2022

(54) PROVIDING ACCESS TO USER-CONTROLLED RESOURCES BY AUTOMATED ASSISTANTS

(71) Applicant: Google LLC, Mountain View, CA (US)

(72) Inventors: Ibrahim Badr, Zurich (CH); Yariv Adan, Cham (CH); Hugo Santos, Zurich (CH); Shikha Kapoor, Sunnyvale, CA (US); Karthik Nagaraj, Dublin, CA (US); Glenn Wilson, Mountain View, CA (US); Arwa Rangwala, Mountain View, CA (US); Leo Deegan, Mountain View, CA (US); Peter Krogh, Nevada City, CA (US)

(73) Assignee: GOOGLE LLC, Mountain View, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/789,370

(22) Filed: Feb. 12, 2020

(65) Prior Publication Data

US 2020/0184156 A1 Jun. 11, 2020

Related U.S. Application Data

(63) Continuation-in-part of application No. 16/157,017, filed on Oct. 10, 2018, now Pat. No. 10,685,187, (Continued)

(51) Int. Cl.
*G06F 40/40* (2020.01)
*G10L 15/26* (2006.01)
(Continued)

(52) U.S. Cl.
CPC .............. *G06F 40/40* (2020.01); *G06F 3/167* (2013.01); *G06F 9/468* (2013.01); *G06F 9/54* (2013.01);
(Continued)

(58) Field of Classification Search
CPC .......... G06F 40/40; G06F 3/167; G06F 9/468; G06F 9/54; G06F 16/3329;
(Continued)

(56) References Cited

U.S. PATENT DOCUMENTS 3,651,270 A 3/1972 Lee et al.
5,375,244 A 12/1994 McNair
(Continued)

FOREIGN PATENT DOCUMENTS

CN 106683661 5/2017
CN 108205627 6/2018
(Continued)

OTHER PUBLICATIONS

Chung et al.; Alexa, Can I trust You? IEEE, Computer; vol. 50; Issue 9; pp. 100-104; dated Sep. 22, 2017.
(Continued)

*Primary Examiner* — Fariba Sirjani
(74) *Attorney, Agent, or Firm* — Middleton Reutlinger

(57) ABSTRACT

Methods, apparatus, and computer readable media are described herein for allowing a first user to interface with an automated assistant to assign tasks to additional user(s), and/or for causing notification(s) of the assigned task to be rendered to the additional user(s) via corresponding automated assistant interface(s). In various implementations, one or more criteria can be utilized in selecting a group of client device(s), linked to the additional user, via which to provide the notification(s) for the task assigned to the additional user. Also, in various implementations condition(s) for providing (Continued)

the notification(s) for the task can be determined, and the notification(s) provided based on determining satisfaction of the condition(s).

20 Claims, 15 Drawing Sheets

Related U.S. Application Data which is a continuation of application No. 15/595,004, filed on May 15, 2017, now Pat. No. 10,127,227.

(51) Int. Cl.
| | |
|---|---|
| *G10L 15/22* | (2006.01) |
| *G10L 15/18* | (2013.01) |
| *G10L 21/06* | (2013.01) |
| *G06F 9/46* | (2006.01) |
| *G06F 16/9537* | (2019.01) |
| *G06F 16/33* | (2019.01) |
| *G06F 16/332* | (2019.01) |
| *G06F 3/16* | (2006.01) |
| *G06F 9/54* | (2006.01) |

(52) U.S. Cl.
CPC ...... *G06F 16/3329* (2019.01); *G06F 16/3344* (2019.01); *G06F 16/9537* (2019.01); *G10L 15/1815* (2013.01); *G10L 15/22* (2013.01); *G10L 15/26* (2013.01); *G10L 21/06* (2013.01)

(58) Field of Classification Search
CPC ............. G06F 16/3344; G06F 16/9537; G06F 9/5005; G06F 40/30; G06F 40/35; G06F 9/541; G10L 15/1815; G10L 15/22; G10L 15/26; G10L 21/06; G10L 17/00; G10L 2015/223; G10L 2015/228; G10L 15/1822

See application file for complete search history.

(56) References Cited

U.S. PATENT DOCUMENTS

| | | | |
|---|---|---|---|
| 5,493,692 A | 2/1996 | Theimer et al. | |
| 5,533,102 A | 7/1996 | Robinson et al. | |
| 5,652,789 A | 7/1997 | Miner et al. | |
| 5,928,325 A | 7/1999 | Shaughnessy et al. | |
| 5,982,863 A | 11/1999 | Smiley et al. | |
| 5,999,613 A | 12/1999 | Nabkel et al. | |
| 6,047,053 A | 4/2000 | Miner et al. | |
| 6,175,828 B1 | 1/2001 | Kuromusha et al. | |
| 6,496,283 B1 | 12/2002 | Kabeya | |
| 6,751,621 B1 | 6/2004 | Calistri-Yeh et al. | |
| 6,757,362 B1 | 6/2004 | Cooper et al. | |
| 7,137,126 B1 | 11/2006 | Coffman et al. | |
| 7,308,484 B1 | 12/2007 | Dodrill et al. | |
| 7,359,496 B2 | 4/2008 | Qian et al. | |
| 7,443,971 B2 | 10/2008 | Bear et al. | |
| 7,460,652 B2 | 12/2008 | Chang | |
| 7,853,243 B2 | 12/2010 | Hodge | |
| 7,886,334 B1 | 2/2011 | Walsh et al. | |
| 7,945,470 B1* | 5/2011 | Cohen ................... G06Q 10/06 705/7.13 | |
| 8,166,119 B2 | 4/2012 | Ligh et al. | |
| 8,479,302 B1 | 7/2013 | Lin | |
| 8,559,926 B1 | 10/2013 | Zang et al. | |
| 8,576,750 B1 | 11/2013 | Hecht et al. | |
| 8,656,465 B1 | 2/2014 | Fong-Jones | |
| 8,732,246 B2 | 5/2014 | Jayanthi | |
| 8,769,676 B1 | 7/2014 | Kashyap | |
| 8,838,641 B2 | 9/2014 | Saito et al. | |
| 8,892,446 B2 | 11/2014 | Cheyer et al. | |
| 8,914,632 B1 | 12/2014 | Shankar et al. | |
| 8,971,924 B2 | 3/2015 | Pai et al. | |
| 8,990,329 B1 | 3/2015 | Khvostichenko et al. | |
| 9,058,470 B1 | 6/2015 | Nissan et al. | |
| 9,147,054 B1* | 9/2015 | Beal ........................ G06F 21/31 | |
| 9,190,075 B1 | 11/2015 | Cronin | |
| 9,318,108 B2 | 4/2016 | Gruber et al. | |
| 9,509,799 B1 | 11/2016 | Cronin | |
| 9,531,607 B1 | 12/2016 | Pai et al. | |
| 9,571,645 B2 | 2/2017 | Quast et al. | |
| 9,712,571 B1 | 7/2017 | Bertz et al. | |
| 9,805,718 B2 | 10/2017 | Ayan et al. | |
| 9,807,094 B1 | 10/2017 | Liu et al. | |
| 10,032,039 B1 | 7/2018 | Milman et al. | |
| 10,091,230 B1 | 10/2018 | Machani | |
| 10,116,676 B2 | 10/2018 | Roosenraad et al. | |
| 10,235,129 B1* | 3/2019 | Carlson ................... H04N 7/15 | |
| 10,257,241 B2 | 4/2019 | Griffin | |
| 10,404,757 B1 | 9/2019 | Horton | |
| 10,523,814 B1 | 12/2019 | Moore et al. | |
| 10,783,327 B2 | 9/2020 | Gordon | |
| 10,979,461 B1 | 4/2021 | Cervantez et al. | |
| 2001/0039581 A1 | 11/2001 | Deng et al. | |
| 2002/0016729 A1 | 2/2002 | Breitenbach et al. | |
| 2002/0048356 A1 | 4/2002 | Takagi et al. | |
| 2002/0131565 A1* | 9/2002 | Scheuring ............ G06Q 10/109 379/88.19 | |
| 2002/0136370 A1 | 9/2002 | Gallant | |
| 2003/0028593 A1 | 2/2003 | Ye et al. | |
| 2003/0073412 A1 | 4/2003 | Meade | |
| 2004/0117371 A1 | 6/2004 | Bhide et al. | |
| 2004/0139030 A1 | 7/2004 | Stoll | |
| 2004/0187109 A1 | 9/2004 | Ross et al. | |
| 2004/0187152 A1 | 9/2004 | Francis et al. | |
| 2005/0065995 A1 | 3/2005 | Milstein et al. | |
| 2005/0138118 A1 | 6/2005 | Banatwala et al. | |
| 2005/0249023 A1 | 11/2005 | Bodlaender | |
| 2006/0074831 A1 | 4/2006 | Hyder et al. | |
| 2006/0210033 A1 | 9/2006 | Grech et al. | |
| 2006/0253456 A1 | 11/2006 | Pacholec et al. | |
| 2007/0027921 A1 | 2/2007 | Alvarado et al. | |
| 2007/0104361 A1 | 5/2007 | Alexander | |
| 2007/0150426 A1 | 6/2007 | Asher et al. | |
| 2007/0223662 A1 | 9/2007 | Jain et al. | |
| 2007/0266427 A1 | 11/2007 | Kevenaar et al. | |
| 2007/0282598 A1 | 12/2007 | Waelti et al. | |
| 2007/0297430 A1 | 12/2007 | Nykanen et al. | |
| 2008/0025489 A1 | 1/2008 | Dye et al. | |
| 2008/0046369 A1 | 2/2008 | Wood | |
| 2008/0177860 A1 | 7/2008 | Khedouri et al. | |
| 2008/0183811 A1 | 7/2008 | Kotras et al. | |
| 2009/0117887 A1 | 5/2009 | Narayanaswamy et al. | |
| 2009/0197578 A1 | 8/2009 | Kurosawa | |
| 2009/0198678 A1 | 8/2009 | Conrad et al. | |
| 2009/0210148 A1 | 8/2009 | Jayanthi | |
| 2009/0210799 A1 | 8/2009 | Reiser et al. | |
| 2009/0216859 A1 | 8/2009 | Dolling | |
| 2009/0233629 A1 | 9/2009 | Jayanthi | |
| 2010/0005518 A1 | 1/2010 | Tirpak et al. | |
| 2010/0106499 A1 | 4/2010 | Lubowich et al. | |
| 2010/0114571 A1 | 5/2010 | Nagatomo | |
| 2010/0169438 A1 | 7/2010 | Denner et al. | |
| 2010/0180218 A1 | 7/2010 | Boston et al. | |
| 2010/0228777 A1 | 9/2010 | Imig et al. | |
| 2011/0040768 A1 | 2/2011 | Shon et al. | |
| 2011/0083163 A1 | 4/2011 | Auvenshine et al. | |
| 2011/0090899 A1 | 4/2011 | Fedorov | |
| 2011/0144980 A1 | 6/2011 | Rysenga | |
| 2011/0225631 A1 | 9/2011 | Pearson et al. | |
| 2011/0237227 A1 | 9/2011 | Kemery et al. | |
| 2011/0239276 A1 | 9/2011 | Garcia Garcia et al. | |
| 2011/0255412 A1 | 10/2011 | Ngai | |
| 2011/0276896 A1 | 11/2011 | Zambetti et al. | |
| 2012/0005030 A1 | 1/2012 | Valin et al. | |
| 2012/0027256 A1 | 2/2012 | Kiyohara et al. | |
| 2012/0130771 A1 | 5/2012 | Kannan et al. | |
| 2012/0221952 A1 | 8/2012 | Chavez | |
| 2012/0222132 A1 | 8/2012 | Burger et al. | |
| 2012/0254966 A1 | 10/2012 | Parker | |
| 2012/0275450 A1 | 11/2012 | Connelly et al. | |
| 2012/0309510 A1 | 12/2012 | Taylor et al. | |
| 2013/0006636 A1 | 1/2013 | Mizuguchi et al. | |

(56) References Cited

U.S. PATENT DOCUMENTS

| | | |
|---|---|---|
| 2013/0036455 A1 | 2/2013 | Bodi et al. |
| 2013/0080177 A1* | 3/2013 | Chen .................. G10L 15/26 |
| | | 704/275 |
| 2013/0111487 A1 | 5/2013 | Cheyer et al. |
| 2013/0129161 A1 | 5/2013 | Goel |
| 2013/0198811 A1 | 8/2013 | Yu et al. |
| 2013/0262966 A1 | 10/2013 | Wu et al. |
| 2013/0325759 A1 | 12/2013 | Rachevsky et al. |
| 2014/0033274 A1 | 1/2014 | Okuyama |
| 2014/0043426 A1 | 2/2014 | Bicanic et al. |
| 2014/0074545 A1 | 3/2014 | Minder et al. |
| 2014/0081633 A1 | 3/2014 | Badaskar |
| 2014/0171133 A1 | 6/2014 | Stuttle et al. |
| 2014/0172953 A1* | 6/2014 | Blanksteen ............ H04W 4/02 |
| | | 709/203 |
| 2014/0180641 A1 | 6/2014 | Lee et al. |
| 2014/0195621 A1 | 7/2014 | Rao DV |
| 2014/0207953 A1 | 7/2014 | Beck et al. |
| 2014/0267565 A1 | 9/2014 | Nakafuji et al. |
| 2014/0280223 A1 | 9/2014 | Ram et al. |
| 2014/0328570 A1 | 11/2014 | Cheng et al. |
| 2014/0337048 A1 | 11/2014 | Brown et al. |
| 2014/0359717 A1 | 12/2014 | Robertson et al. |
| 2015/0047002 A1 | 2/2015 | Tamura |
| 2015/0051948 A1 | 2/2015 | Aizono et al. |
| 2015/0056951 A1 | 2/2015 | Talwar et al. |
| 2015/0086001 A1 | 3/2015 | Farrand et al. |
| 2015/0101022 A1 | 4/2015 | Zent et al. |
| 2015/0179000 A1* | 6/2015 | Jayanthi .............. H04W 4/023 |
| | | 701/32.4 |
| 2015/0181367 A1 | 6/2015 | Nguyen et al. |
| 2015/0185996 A1 | 7/2015 | Brown et al. |
| 2015/0186154 A1 | 7/2015 | Brown et al. |
| 2015/0199523 A1 | 7/2015 | Hamilton et al. |
| 2015/0199567 A1 | 7/2015 | Fume et al. |
| 2015/0207799 A1 | 7/2015 | Steiner et al. |
| 2015/0215350 A1 | 7/2015 | Slayton et al. |
| 2015/0286698 A1 | 10/2015 | Gagnier et al. |
| 2015/0304361 A1 | 10/2015 | Tamura |
| 2015/0324454 A1 | 11/2015 | Roberts et al. |
| 2015/0324606 A1 | 11/2015 | Grondin et al. |
| 2015/0332063 A1 | 11/2015 | Masuda |
| 2015/0348551 A1 | 12/2015 | Gruber et al. |
| 2015/0364141 A1 | 12/2015 | Lee et al. |
| 2015/0365807 A1 | 12/2015 | Gianakis |
| 2015/0379887 A1 | 12/2015 | Becker et al. |
| 2016/0019471 A1 | 1/2016 | Shin et al. |
| 2016/0050217 A1 | 2/2016 | Mare et al. |
| 2016/0063277 A1 | 3/2016 | Vu et al. |
| 2016/0100019 A1 | 4/2016 | Leondires |
| 2016/0125048 A1 | 5/2016 | Hamada |
| 2016/0155442 A1 | 6/2016 | Kannan et al. |
| 2016/0170970 A1 | 6/2016 | Lindblom et al. |
| 2016/0203002 A1 | 7/2016 | Kannan et al. |
| 2016/0212138 A1 | 7/2016 | Lehane |
| 2016/0261425 A1 | 9/2016 | Horton et al. |
| 2016/0352778 A1 | 12/2016 | Chari et al. |
| 2017/0013122 A1 | 1/2017 | Cohen et al. |
| 2017/0054661 A1 | 2/2017 | Golcher Barguil |
| 2017/0091658 A1 | 3/2017 | Matthiesen et al. |
| 2017/0091778 A1 | 3/2017 | Johnson et al. |
| 2017/0098192 A1 | 4/2017 | Follis |
| 2017/0132199 A1 | 5/2017 | Vescovi et al. |
| 2017/0201491 A1 | 7/2017 | Schmidt et al. |
| 2017/0228376 A1 | 8/2017 | Noma |
| 2017/0228550 A1 | 8/2017 | Harb |
| 2017/0262783 A1 | 9/2017 | Franceschini et al. |
| 2017/0289168 A1 | 10/2017 | Bar et al. |
| 2017/0293851 A1 | 10/2017 | Chawla et al. |
| 2017/0318075 A1 | 11/2017 | Liensberger et al. |
| 2017/0337184 A1 | 11/2017 | Quah et al. |
| 2017/0337287 A1 | 11/2017 | Gill |
| 2017/0344649 A1* | 11/2017 | Vinnakota .......... G06F 16/9535 |
| 2017/0372095 A1 | 12/2017 | Ferrara et al. |
| 2017/0372429 A1 | 12/2017 | La Placa |
| 2018/0018384 A1 | 1/2018 | Nomura et al. |
| 2018/0046986 A1 | 2/2018 | Wang et al. |
| 2018/0054852 A1 | 2/2018 | Mohan et al. |
| 2018/0060599 A1 | 3/2018 | Horling et al. |
| 2018/0088777 A1 | 3/2018 | Daze et al. |
| 2018/0109649 A1 | 4/2018 | Bhupati |
| 2018/0121665 A1 | 5/2018 | Anderson et al. |
| 2018/0129960 A1 | 5/2018 | Caballero et al. |
| 2018/0182391 A1* | 6/2018 | Lee ........................ G06N 5/02 |
| 2018/0248888 A1 | 8/2018 | Takahashi et al. |
| 2018/0288063 A1 | 10/2018 | Koottayi et al. |
| 2018/0358035 A1 | 12/2018 | Tomar et al. |
| 2019/0042564 A1 | 2/2019 | Badr et al. |
| 2019/0065975 A1 | 2/2019 | White |
| 2019/0108353 A1 | 4/2019 | Sadeh et al. |
| 2019/0138996 A1 | 5/2019 | Salvi et al. |
| 2019/0149549 A1 | 5/2019 | Sun et al. |
| 2019/0196779 A1 | 6/2019 | Declerck et al. |
| 2019/0205301 A1 | 7/2019 | Ni |
| 2019/0207946 A1 | 7/2019 | Mertens et al. |
| 2019/0272831 A1* | 9/2019 | Kajarekar ............... G10L 15/22 |
| 2020/0029167 A1 | 1/2020 | Bostick et al. |
| 2020/0065513 A1 | 2/2020 | Sridharan et al. |
| 2020/0081736 A1 | 3/2020 | Gopalan et al. |
| 2020/0134211 A1 | 4/2020 | Miller et al. |
| 2021/0209700 A1* | 7/2021 | Lubash .................. G06Q 50/01 |

FOREIGN PATENT DOCUMENTS

| | | |
|---|---|---|
| DE | 102017122358 | 6/2018 |
| EP | 1672896 | 6/2006 |
| EP | 2528360 | 11/2012 |
| JP | 2014514623 | 6/2014 |
| JP | 2015518201 | 6/2015 |
| WO | 2015049948 | 4/2015 |
| WO | 2017076211 | 5/2017 |
| WO | 2018118164 | 6/2018 |

OTHER PUBLICATIONS

Orwant, J. "DoppelgAnger Goes to School: Machine Learning for User Modeling". Diss. Massachusetts Institute of Technology, 1993; 89 pages.

International Search Report and Written Opinion of PCT Ser. No. PCT/US2018/032519, 15 pages dated Aug. 1, 2018.

Castagnos, Sylvain, Amaury L'huillier, and Anne Boyer. "Toward a robust diversity-based model to detect changes of context." In Tools with Artificial Intelligence (ICTAI), 2015 IEEE 27th International Conference on, pp. 534-541. IEEE, 2015. (Year: 2015).

Oberheide, Jon, and Famam Jahanian. "When mobile is harder than fixed (and vice versa): demystifying security challenges in mobile environments." In Proceedings of the Eleventh Workshop on Mobile Computing Systems & Applications, pp. 43-48. ACM, 2010. (Year: 2010).

Hong, D. et al., "Setting Access Permission through Transitive Relationship in Web-based Social Networks;" Weaving Services and People on the World Wide Web; Springer; pp. 229-253; 2009.

European Patent Office, Communication issued in Application No. 18731249.1, dated Dec. 17, 2021.

* cited by examiner

PROVIDING ACCESS TO USER-CONTROLLED RESOURCES BY AUTOMATED ASSISTANTS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using spoken natural language input (i.e. utterances) which may in some cases be converted into text and then processed, and/or by providing textual (e.g., typed) natural language input.

In some cases, automated assistants may include automated assistant "clients" that are installed locally on client devices and that are interacted with directly by users, as well as cloud-based counterpart(s) that leverage the virtually limitless resources of the cloud to cooperate with automated assistant clients respond to users' requests. For example, the automated assistant client may provide, to the cloud-based counterpart(s), an audio recording of the user's voice input (or a text conversion thereof) and data indicative of the user's identity (e.g., credentials). The cloud-based counterpart may perform various processing on the input to return various results to the automated assistant client, which may then provide corresponding output to the user (or take some other action). For the sakes of brevity and simplicity, the term "automated assistant," when described herein as "serving" a particular user, may refer to the automated assistant client installed on the particular user's client device and any cloud-based counterpart that interacts with the automated assistant client to respond to the user's queries. As used herein, the terms "task request" or "request" refer to requests to perform a task, search queries (searches for information), other queries, or any other command or statement from a user directed at an automated assistant to cause the automated assistant to respond.

An automated assistant may have access to publicly-available data such as documents and other information available on the Internet, as well as "user-controlled resources" under the control of a particular user served by the automated assistant. User-controlled resources may be associated with a "user account" of the user, and may be locally accessible from client device(s) operated by the user and/or remotely (e.g., in the so-called "cloud"). User-controlled resources may take various forms, such as a user's calendar, emails, text messages, reminders, shopping lists, search history, photos, documents, sensor data (e.g., position coordinates), content of past human-to-computer dialogs, personal preferences, and so forth.

In some cases, the automated assistant may gain access to user-controlled resources by way of the associated user account. For example, when the user installs or first engages with an automated assistant client on a particular client device, the user may grant the automated assistant permission to access some or all of the user-controlled resources. In other words, the user effectively grants the automated assistant access to user-controlled resources. In some cases, this may include modifying an access control list (or other similar security mechanism) that regulates access to the user-controlled resources.

An automated assistant that serves a first user may not have access to user-controlled resources of another user. For example, the first user may not be able to instruct an automated assistant that serves the first user to add an item to someone else's shopping list, or to determine whether someone else is available for a meeting at a particular time/location. Moreover, some tasks may require engagement by multiple users. For example, if an automated assistant serving a first user does not have access to a second user's schedule, and the first user wishes to determine whether the second user is available at a particular time/location for a meeting, the first user may be required to contact the second user (e.g., by phone or using text messaging) and the second user may confirm availability. This becomes more cumbersome if the first user wishes to schedule a meeting with multiple other users. Additionally, there is not currently a way for a first user to instruct an automated assistant serving the first user to cause an automated assistant serving a second user to proactively engage with the second user, e.g., at a particular time or location.

SUMMARY

Techniques are described herein for allowing automated assistants serving users to (directly or indirectly) access resources controlled by others, including resources available to automated assistants serving others. In various implementations, a first user may provide natural language input (e.g., typed, spoken) to an automated assistant client executing on a first client device (e.g., smart phone, smart watch, stand-alone interactive speaker, etc.) operated by the first user. The natural language input may include a "task request" that seeks access to user-controlled resources of a second user. An access control list may include resources to which the automated assistant serving the second user device has access, as well as at least one or more subsets of those resources to which automated assistants serving other users have access. The automated assistant serving the first user may check (or as described below may have one or more cloud-based "services" check) the access control list associated with the second user to determine whether the first user has appropriate access rights as regards the second user. If the user has appropriate access, then action may be taken in response to the task request (e.g., responded to, undertaken, etc.)

Action may be taken in response to a task request in various ways by various components. In some implementations, an automated assistant serving the first user may access the user-controlled resources the second user, e.g., reading from the second user's user-controlled resources (e.g., obtaining the second user's current position, checking the second user's calendar, etc.) and/or writing to the second user's user-controlled resources (e.g., adding/editing a calendar entry, adding a reminder, adding a shopping list item, etc.). In other implementations, the automated assistant serving the second user may take action in response to the task request. In yet other implementations, one or more cloud-based "services" may action the task request on behalf of either automated assistant. For example, in some implementations, one service may provide access to the second user's calendar, another service may provide access to the second user's shopping list, another service may provide access to the second user's current location, another service may provide access to the second user's reminder list, etc.

In some implementations, taking action on a task request may cause the automated assistant serving second user to proactively engage the second user (e.g., without the second user initiating the human-to-computer dialog), contemporaneously with the first user's task request or at a later time, e.g., in response to one or more events. For example, suppose the first user provides the automated assistant serving the first user the task request, "remind <second user> to pick up milk on the way home from work." Suppose further that the access control list of the second user grants the first user access to the second user's shopping list. An automated assistant serving either user, or a cloud-based service acting on either automated assistant's behalf, may cause "milk" to be added to the second user's shopping list. Additionally, the automated assistant serving the second user may "surface" the reminder to the second user (e.g., by providing audible output such as "<first user> would like you to pick up milk on your way home") in response to one or more signals, e.g., generated by the second user's client device, that suggest the second user is headed home from work. For example, if the current time corresponds to the end of a workday and a position coordinate sensor (e.g., GPS-based) on the second user's client device provides a signal that indicates the second user is travelling home, the automated assistant serving the second user may surface the reminder, e.g., by speaking the reminder to the second user.

Techniques described herein may provide for a number of technical advantages. Enabling a user to interact with an automated assistant, particularly using voice commands, may enable the user to perform various tasks, such as taking a poll, sending a message to other users via their automated assistants, modifying other users' shopping lists/reminder lists/calendars, etc., using fewer inputs. This may benefit users who may have diminished abilities to provide manual input, such as users that are driving, users that have physical disabilities that make entering input manually difficult, etc. Additionally, the user on the other end of the transaction may benefit because their automated assistant may be able to provide them with information from someone else at a more opportune time. For example, in one example described below, an individual may receive (from their automated assistant) a reminder from someone else to pick up something from the store when they are on their way home, rather than simply receiving the message as soon as the sender sent it. This reduces the likelihood that the individual will fail to fulfill the request.

In some implementations, a method performed by one or more processors is provided that includes receiving, from a first user and at a first client device, first voice input directed to a first automated assistant interface of the first client device. The method further includes determining, based on processing the first voice input, that: the first voice input comprises a task, that the first voice input assigns the task to at least a second user, and that the first voice input specifies one or more conditions for notifying the second user of the task. The method further includes determining, based on checking an access control list, that the first user has appropriate access rights to assign tasks to the second user. The method further includes, in response to determining that the first voice input assigns the task to the second user and in response to determining that the first user has appropriate access rights to assign tasks to the second user: selecting, from a plurality of second user client devices that are each linked with the second user and that each have a respective automated assistant interface, a group of one or more of the second user client devices via which to notify the second user of the task. The method further includes causing, based on determining satisfaction of the one or more conditions, each of the one or more second user client devices of the group to render a corresponding notification of the task.

These and other implementations of the technology disclosed herein can include one or more of the following features.

In some implementations, the one or more second user client devices, of the group, include a subset of the plurality of second user client devices that are each linked with the second user. In some versions of those implementations, selecting the group of the one or more of the second user client devices includes selecting the one or more of the second user client devices based on at least one of the one or more conditions. In some of those versions, the at least one of the one or more conditions includes a locational condition of the second user. For example, the locational condition can specify a particular environment, or an area within the particular environment, and selecting the group of the one or more of the second user client devices can include selecting the one or more of the second user client devices based on the subset of the plurality of second user client devices each having a non-transient assignment, in a device topology linked to the second user, to the particular environment or the area. For instance, the locational condition can specify the area within the particular environment, and the method can further include determining the satisfaction of the one or more conditions based on determining that the second user is present near the subset of the plurality of second user client devices. Determining that the second user is present near the subset of the plurality of second user client devices can be based on at least a given second user client device, of the subset of the plurality of second user client devices, locally verifying that the second user is present in vision data captured by a vision sensor of the given second user client device and/or locally verifying that a voice signature of the second user is present in audio data captured by one or more microphones of the given second user client device. As another example, the locational condition can be a point of interest that is not defined in a device topology for the second user, and selecting the group of the one or more of the second user client devices can include selecting the one or more of the second user client devices based on the subset of the plurality of second user client devices each having a corresponding current transient location that is within a threshold distance of the point of interest.

In some implementations, the method further includes, prior to determining satisfaction of the one or more conditions, and in response to determining that the first voice input assigns the task to the second user and in response to determining that the first user has appropriate access rights to assign tasks to the second user: causing at least one of the one or more second user client devices to render a task assignment notification. The task assignment notification can differ visually and/or audibly from the corresponding notification, and can convey that the first user has assigned the task to the second user.

In some implementations, the method further includes, subsequent to causing each of the one or more second user client devices of the group to render the corresponding notification of the task: determining, based on user interface input of the second user that is provided at a given one of the one or more second user client devices of the group, that the second user has completed the task; and rendering, at the first client device and responsive to determining that the second user has completed the task, a completion notification that conveys, to the first user, that the second user has completed the task.

In some implementations, one or more second user client devices, of the group, include a subset of the plurality of second user client devices that are each linked with the second user. In some versions of those implementations, the at least one of the one or more conditions include a temporal condition, and selecting the group of the one or more of the second user client devices includes selecting the one or more of the second user client devices based on determining that the second user is present near the subset of the plurality of second user client devices when the temporal condition is satisfied. In some of those versions, the temporal condition includes a range of times, and causing each of the one or more second user client devices of the group to render the corresponding notification of the task is further based on determining that the second user is present near the subset of the plurality of second user client devices.

In some implementations, the method further includes determining, based on processing the first voice input, that the first voice input also assigns the task to a third user, and that the first voice input also specifies the one or more conditions for notifying the third user of the task. In those implementations, the method further includes determining, based on checking the access control list, that the first user has appropriate access rights to assign tasks to the third user. In those implementations, the method further includes, in response to determining that the first voice input assigns the task to the third user and in response to determining that the first user has appropriate access rights to assign tasks to the third user: selecting, from a plurality of third user client devices that are each linked with the third user and that each have a respective automated assistant interface, an additional group of one or more of the third user client devices via which to notify the third user of the task; and causing, based on determining satisfaction of the one or more conditions, each of the one or more third user client devices of the additional group to render a corresponding notification of the task. In some versions of those implementations, the one or more of the third user client devices of the additional group are mutually exclusive from the one or more second user client devices of the group. In some alternative versions of those implementations, at least one of the one or more of the third user client devices of the additional group is the same as at least one the one or more second user client devices of the group.

In some implementations, a method performed by one or more processors is provided that includes receiving first voice input, of a first user, that is directed to an automated assistant interface. The method further includes determining, based on processing the first voice input, that the first voice input comprises a task, and that the first voice input assigns the task to at least a second user and a third user. The method further includes determining, based on checking an access control list, that the first user has appropriate access rights to assign tasks to the second user and has appropriate access rights to assign tasks to the third user. The method further includes, in response to determining that the first voice input assigns the task to the second user and the third user, and in response to determining that the first user has appropriate access rights to assign tasks to the second user and the third user: causing a second user notification of the task to be rendered at a second client device based on determining presence of the second user near the second client device; and causing a third user notification of the task to be rendered at a third client device based on determining presence of the third user near the third client device.

These and other implementations of the technology disclosed herein can include one or more of the following features.

In some implementations, determining that the second user is present near the second client device is based on the second client device locally verifying that the second user is present in vision data captured by a vision sensor of the second client device and/or locally verifying that a voice signature of the second user is present in audio data captured by one or more microphones of the second client device. In some of those implementations, determining that the third user is present near the third client device is based on the third client device locally verifying that the third user is present in vision data captured by a vision sensor of the third client device and/or locally verifying that a voice signature of the third user is present in audio data captured by one or more microphones of the third client device. In some versions of those implementations, the method further includes determining, based on processing the first voice input, that the first voice input specifies a temporal condition for notifying the second user and the third user of the task, such as a temporal condition that includes a particular day and/or a time range. In some of those versions, causing the second user notification of the task to be rendered at the second client device is based on determining presence of the second user near the second client device on the particular day and/or within the time range, and causing the third user notification of the task to be rendered at the third client device is based on determining presence of the third user near the third client device on the particular day and/or within the time range.

In some implementations, the second user notification of the task includes an alias of the second user, and lacks any alias of the third user. In some of those implementations, the third user notification of the task includes an alias of the third user, and lacks any alias of the second user.

In some implementations, a method performed by one or more processors is provided that includes: receiving a voice input from a first user; recognizing a task request from the voice input; analyzing the task request; in response to the analyzing, determining that the task request relates to a second user and checking an access control list relating to an automated assistant engaged by the second user to determine whether the first user has appropriate access rights as regards the second user; and in response to determining that the first user has appropriate access rights as regards the second user, taking action on the task request.

These and other implementations of technology disclosed herein may optionally include one or more of the following features.

In various implementations, the access control list may indicate access rights regarding one or more services with which the second user has a respective account. In various implementations, the access control list may indicate access rights regarding multiple services with which the second user has respective accounts. In various implementations, the access control list may indicate access rights regarding services selected from the group of: a schedule service, an automated assistant liaison service, a location service, a shopping list service, and a reminder service.

In various implementations, checking the access control list to determine whether the first user has appropriate access rights as regards the second user may include determining that the first user is a member of a first group and determining that the first group has appropriate access rights. In various implementations, taking action on the task request may include reading information from the second user's account with a service. In various implementations, taking action on the task request may include writing information to the second user's account with a service. In various implementations, taking action on the task request may include an automated assistant associated with the first user writing information to the second user's account with a service. In various implementations, taking action on the task request may include an automated assistant associated with the second user writing information to the second user's account with a service.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
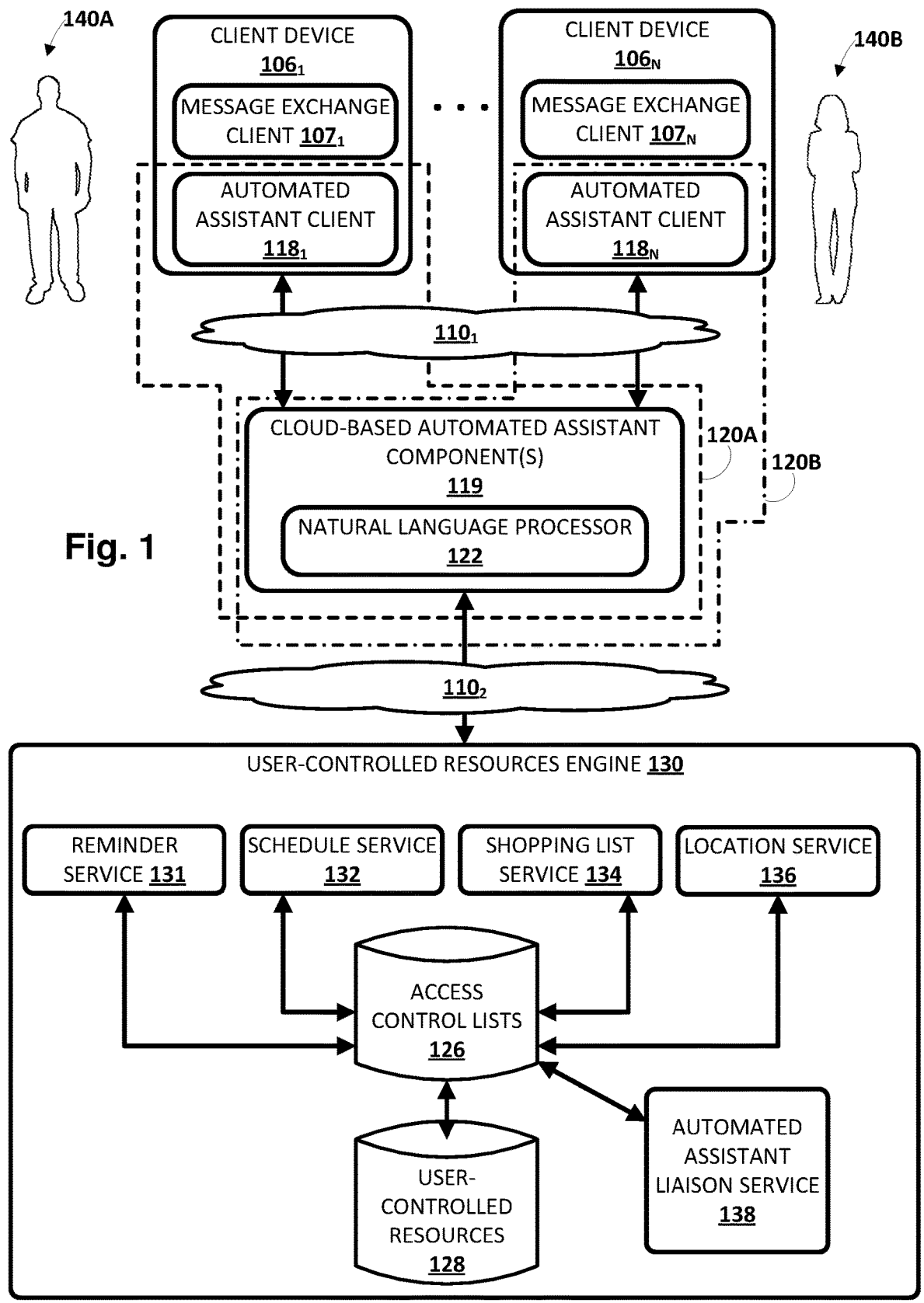
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at $110_1$.

As noted in the background, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user 140A operating first client device $106_1$ and includes automated assistant client $118_1$ and one or more cloud-based automated assistant components 119. A second automated assistant 120B encompassed by a dash-dash-dot line serves a second user 140B operating another client device $106_N$ and includes automated assistant client $118_N$ and one or more cloud-based automated assistant components 119. It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, and/or a wearable apparatus of the user that includes a computing device (e.g., a watch of the user having a computing device, glasses of the user having a computing device, a virtual or augmented reality computing device). Additional and/or alternative client computing devices may be provided.

In some implementations, a given user may communicate with automated assistant 120 utilizing a plurality of client computing devices 106 that collectively from a coordinated "ecosystem" of computing devices. In some such implementations, automated assistant 120 may be considered to "serve" that given user, e.g., endowing automated assistant 120 with enhanced access to user-controlled content (e.g., resources, documents, etc.) for which access is controlled by the "served" user.

For example, in FIG. 1, a user-controlled resources engine 130 may be implemented on one or more computing devices (which again may be collectively referred to as a "cloud") to control access to resources controlled by each user. In some implementations, user-controlled resources engine 130 may be operably coupled with one or more computing systems that implement automated assistant 120 via one or more local and/or wide area networks (e.g., the Internet) indicated generally at $110_2$. Additionally or alternatively, user-controlled resources engine 130 may be implemented in whole or in part on the same computing systems that implement automated assistant 120. In some implementations, user-controlled resources engine 130 may include one or more access control lists 126 that govern access to user-controlled resources 128. In some implementations, access control list 126 may indicate access rights regarding one or more services with which each user has a respective account. In various implementations, access control list 126 may indicate access rights regarding multiple services with which each user has respective accounts. Access control lists 126 may take various forms, such as database entries or a list of access control entries, that include indications, for each user, of what content controlled by that user is accessible to others (including the others' automated assistants), how it is accessible (e.g., read, write, etc.), and so forth.

User-controlled resources 128 may include various data associated with each user. This data may include documents associated with the user (and in many cases, with one or more accounts of the user), such as documents the user stores on a so-called "cloud" drive." It may also include emails and other electronic correspondence (e.g., text messages, social media posts, etc.). In some implementations, user-controlled resources 128 may include behavior related to the user's behavior, such as search query history (e.g., search logs), past conversations with an automated assistant 120, and so forth. User-controlled resources 128 may also include other resources associated with a user, such as a calendar, a reminder list, a shopping list, sensor data (e.g., position coordinate data produced by, for instance, a Global Positioning System, or "GPS," sensor), and so forth.

As noted in the background, user-controlled resources 128 associated with a particular user may be associated with a "user account" of the user. In some instances, a user may sign into his or her user account on one or more client devices (e.g., using various credentials such as a username/password, biometrics, etc.), thereby endowing an automated assistant 120 (including the locally-executing client 118 and any online components 119) that serves the user with access to these resources. In some cases, automated assistant 120 may gain access to user-controlled resources 128 by way of the associated user account. For example, when the user installs or first engages with automated assistant client 118 on a particular client device 106, the user may grant automated assistant 120 permission to access some or all of the user-controlled resources 128 controlled by the user. In other words, the user effectively grants automated assistant 120 access to user-controlled resources 128. In some cases, this may include modifying access control list 126 (or other similar security mechanism).

Additionally, in some implementations, a user's account may be linked with (e.g., provide the user with access to) multiple services 130-138 (which will be described in more detail below), such that being logged into the user's account at a client device 106 gives the user's automated assistant 120 access to these services. Additionally or alternatively, the user may have separate accounts with each of these services, and in some cases one or more of these separate accounts may be linked to a primary account (e.g., a social network account) of the user. Or, the user may elect to modify access control list 126 to permit, on an individual basis, each separate account associated with each corresponding individual service access to user-controlled resources 128 associated with the user. In some implementations, a separate access control list may be provided for each service.

While user-controlled resources 128 is depicted in FIG. 1 as a single database, this is not to suggest that all user-controlled resources is stored in a single location. To the contrary, in many implementations, user-controlled resources may be stored (or otherwise available) in part on client devices 106 (e.g., sensor signals such as GPS), and/or may be distributed across a variety of cloud-based systems, each which may serve a different purpose (e.g., one set of one or more servers may provide email functionality, another set of one or more servers may provide calendar functionality, etc.).

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage interactive voice response ("IVR"), such that the user can utter commands, searches, etc., and the automated assistant may utilize natural language processing and/or one or more grammars to convert the utterances into text, and respond to the text accordingly.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

Automated assistant 120 (and in particular, cloud-based automated assistant components 119) may include a natural language processor 122 and other components that are not depicted in FIG. 1. In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants in the thread). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

In some implementations, when automated assistant 120 provides a prompt that solicits user feedback, automated assistant 120 (and in particular, automated assistant client 118) may preemptively activate one or more components of the client device (via which the prompt is provided) that are configured to process user interface input to be received in response to the prompt. For example, where the user interface input is to be provided via a microphone of the client device $106_1$, automated assistant 120 may provide one or more commands to cause: the microphone to be preemptively "opened" (thereby preventing the need to hit an interface element or speak a "hot word" to open the microphone), a local speech to text processor of the client device $106_1$ to be preemptively activated, a communications session between the client device $106_1$ and a remote speech to text processor to be preemptively established, and/or a graphical user interface to be rendered on the client device $106_1$ (e.g., an interface that includes one or more selectable elements that may be selected to provide feedback). This may enable the user interface input to be provided and/or processed more quickly than if the components were not preemptively activated.

Natural language processor 122 of automated assistant 120 processes natural language input generated by users via client devices $106_{1-N}$ and may generate annotated output for use by one or more other components of automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

In various implementations, user-controlled resources engine 130 may include one or more "services," any of which may be implemented using any combination of hardware or software, that are configured to service requests for particular types of user-controlled resources. For example, in FIG. 1, user-controlled resources engine 130 includes a reminder service 131, a schedule service 132, a shopping list service 134, a location service 136, and an automated assistant liaison service 138. These services are illustrated only as examples, and are not meant to be exhaustive. Moreover, in various implementations, one or more of these services may be implemented separately (as shown in FIG. 1) or as integral parts of a single service.

In various implementations, each service may be configured to service requests from automated assistant 120 for a particular type of data transaction. For example, reminder service 131 may handle requests to view and/or edit data related to users' reminder or tasks lists (which in some cases may be integral parts of a larger calendaring system). Schedule service 132 may handle requests to view and/or edit data related to users' calendars/schedules. Shopping list service 134 may handle requests to view and/or edit data related to users' shopping lists. Location service 136 may handle requests to view data pertaining to user locations. Other possible services not depicted in FIG. 1 include services that handle requests to view and/or edit users' cloud-based documents, services that handle requests to read users' media (e.g., cloud-stored photos, music, movies, etc.), and so forth.

Automated assistant liaison service 138 may be configured to facilitate the exchange of data between individuals by way of their respective automated assistants 120 (synchronously or asynchronously). For example, in many scenarios, a given user may not necessarily need to access data controlled by another user. Instead, the given user may simply want to cause the other user's automated assistant to interact with the other user, e.g., by engaging in a human-to-computer dialog with the other user, soliciting information from the other user (or multiple users in a polling scenario), etc. As was the case with data requests serviced by services 130-136, access control list 126 may also define, for each given automated assistant 120 serving a particular user, permissions governing whether other users' automated assistants 120 can trigger the given automated assistant 120 to take some action, such as proactively initiating a human-to-computer dialog with the particular user served by the given automated assistant 120.

In various implementations, the services 130-138 may handle requests from automated assistant 120 in accordance with permissions indicated in access control lists 126. For example, suppose a first user 140A operating first client device 106₁ (and logged into a corresponding account on client device 106₁) requests that automated assistant 120 add an entry to a calendar controlled by the first user 140A. In various implementations, the first user's automated assistant 120 may request that schedule service 132 add the calendar entry. Schedule service 132 may determine (or in other implementations, automated assistant 120 may determine), based on information contained in access control lists 126, that it has permission to edit calendar information associated with first user 140A, and thus may take action on the request by adding the entry.

In addition to taking action on a user's request pertaining to the user's own resources, in various implementations, techniques are described herein for taking action on a user's request pertaining to resources controlled by other users. For example, suppose a voice input is received from first user 140A that requests that a reminder be added to a reminder list associated with a second user 140B. That task request may be recognized, e.g., by natural language processor 122, from the voice input. Automated assistant 120 may analyze the task request, e.g., using query processing. In response to the analysis, automated assistant 120 or one or more components of user-controlled resources engine 130 may determine that the task request relates to second user 140B. Accordingly, access control list 126 may be checked in relation to an automated assistant 120 engaged by second user 140B to determine whether first user 140A has appropriate access rights as regards second user 140B (e.g., whether first user 140A has the right to add reminders to a reminder list controlled by second user 140B). In response to determining that first user 140A has appropriate access rights as regards second user 140B, one or more components in FIG. 1, such as automated assistant 120 and/or one or more components of user-controlled resources engine 130, may take action on the task request, e.g., by adding the reminder to the reminder list controlled by second user 140B.

Additionally or alternatively, in various implementations, first user 140A may provide a request that causes (e.g., by way of automated assistant liaison service 138) an automated assistant 120B serving second user 140B (e.g., automated assistant client $118_N$ in combination with one or more cloud-based automated assistant components 119) to engage second user 140B in some sort of dialog. Continuing with the example described above, in some implementations, an automated assistant 120 serving second user 140B may, e.g., at the request of automated assistant liaison service 138, proactively incorporate, into a human-to-computer dialog with second user 140B (i.e., by way of second user 140B interacting directly with automated assistant client $118_N$), an indication that first user 140A is adding a reminder to the reminder list associated with second user 140B. In some implementations, automated assistant 120 may simply notify second user 140B of the addition, e.g., by way of an audible or visual prompt. In other implementations, e.g., where access control list 126 does not already provide first user 140A with permission to add reminders, automated assistant 120 may first solicit permission from second user 140B for first user 140A to add the reminder.

Figure 2A:
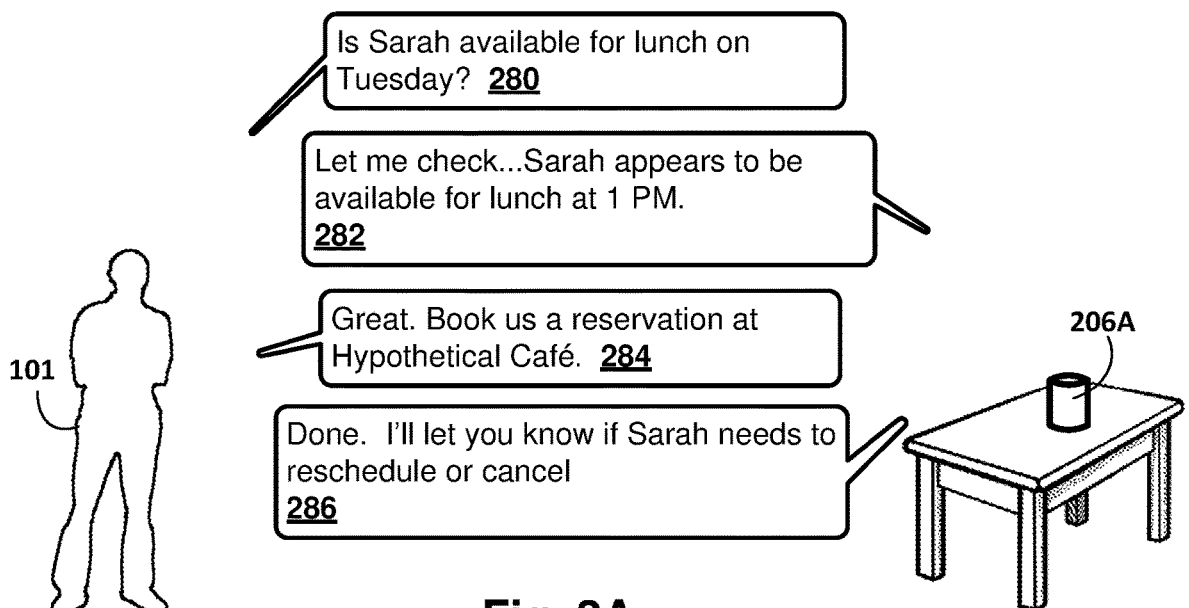
FIGS. 2A, 2B, 3A, 3B, 4A, 4B, 5, 6, 7A, 7B, and 8 depict example dialogs between various users and automated assistants, in accordance with various implementations.

FIG. 2A illustrates an example of a human-to-computer dialog session between user 101 and an instance of automated assistant (120A or B in FIG. 1, not depicted in FIG. 2) that may occur, via the microphone(s) and speaker(s) of a client computing device 206A (depicted as a standalone interactive speaker but this is not meant to be limiting) according to implementations described herein. One or more aspects of automated assistant 120 may be implemented on the computing device 206A and/or on one or more computing devices that are in network communication with the computing device 206A.

In FIG. 2A, user 101 ("Dave") provides natural language input 280 of "Is Sarah available for lunch on Tuesday?" in a human-to-computer dialog session between the user 101 and automated assistant 120. In response to the natural language input 280, automated assistant 120 interacts with user-controlled resources engine 130 to determine whether access control list 126 permits Dave, and more particularly, an automated assistant 120 serving Dave, to read data from Sarah's schedule. For example, Dave's automated assistant 120 may interact with schedule service 132, which may determine whether Dave has appropriate access rights as regards Sarah. Assuming Dave has such rights, schedule service 132 may either permit Dave's automated assistant to analyze Sarah's calendar, or may analyze Sarah's calendar itself. Either way, a determination may be made, e.g., by Dave's automated assistant 120 and/or schedule service 132, that Sarah is available for lunch on Tuesday at 1 PM. Accordingly, Dave's automated assistant 120 (executing on client device 206A) may provide responsive natural language output 282 of "Let me check . . . Sarah appears to be available for lunch at 1 PM." At 284, Dave then responds, "Great. Book us a reservation at Hypothetical Café." Dave's automated assistant 120 performs any processing required to book the reservation (e.g., by interacting with a reservation system associated with the restaurant) and responds, "Done. I'll let you know if Sarah needs to reschedule or cancel."

Figure 2B:
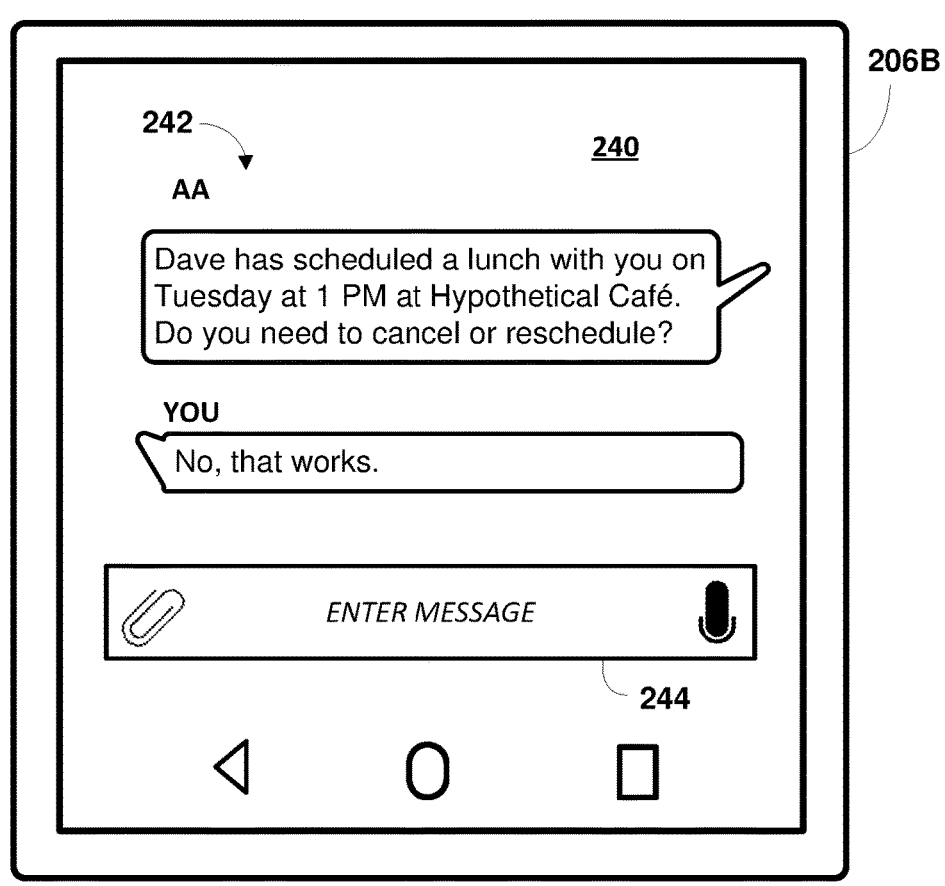

FIG. 2B depicts the same scenario as was depicted in FIG. 2A, except from the perspective of a client device 206B (in the form of a tablet or smart phone but not so limited) operated by Sarah. Client device 206B includes a touchscreen 240, a transcript 242 of a human-to-computer dialog between Sarah and her automated assistant 120 (e.g., rendered in a message exchange client 107), and an input field 244 that may receive text, speech-to-text, or other types of input (e.g., images) from Sarah. In this example, Sarah's automated assistant 120 ("AA" in FIG. 2B and elsewhere herein) provides the following natural language output in response to Dave's successful attempt to schedule a lunch with Sarah by adding an entry to her calendar: "Dave has scheduled a lunch with you on Tuesday at 1 PM at Hypothetical Café. Do you need to cancel or reschedule?" Sarah responds, "No, that works," at which point Sarah's automated assistant 120 may take no further action. However, had Sarah responded in the negative, Sarah's automated assistant 120 could have cancelled the calendar entry added by Dave's automated assistant from her calendar. Additionally, Sarah's automated assistant 120 could have caused (e.g., by way of automated assistant liaison service 138)) Dave's automated assistant 120 to provide output, e.g., via a speaker of client device 206A, that Sarah cancelled the lunch. Additionally or alternatively, Sarah could attempt to reschedule the lunch using techniques similar to those used by Dave when he originally scheduled the lunch.

Figure 3A:
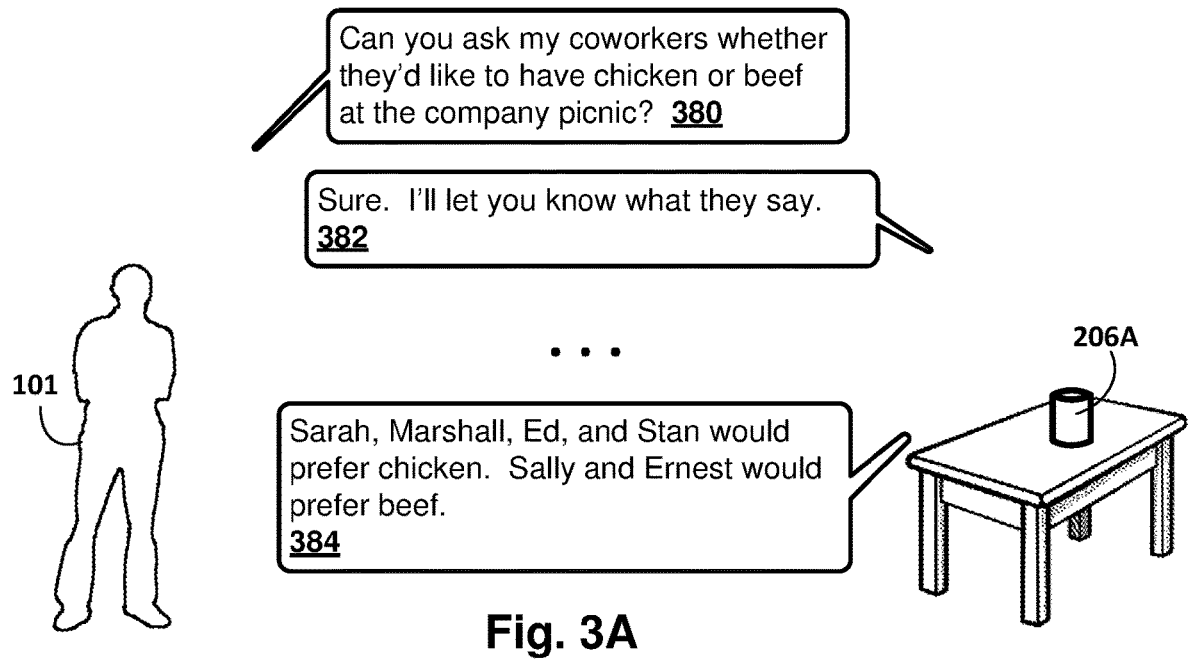

In some implementations, techniques described herein may be used by a single user to poll multiple other individuals, e.g., by way of automated assistant liaison service 138 coordinating communication with the other individuals' automated assistants 120 and collecting the results. FIG. 3A depicts another example dialog between the user "Dave" 101 and automated assistant 120 operating on the computing device 206A during a different session. At 380, the Dave 101 speaks the phrase, "Can you ask my coworkers whether they'd like to have chicken or beef at the company picnic?" At 382 Dave's automated assistant 120 responds, "Sure. I'll let you know what they say." At this point, Dave's automated assistant 120 may interact with various components of user-controlled resources engine 130, such as automated assistant liaison service 138, which may in turn interact with automated assistants 120 that serve individuals known to be Dave's coworkers (which may be set up, by Dave for instance, as a group of Dave's contacts, or may include a group of Dave's social networking contacts who all work for the same employer), in order to solicit answers from the other coworkers. For example, automated assistant liaison service 138 may check access control list 126 to determine whether, for each coworker (or in some cases, for a predefined group of coworker), Dave's automated assistant 120 has permission to trigger the coworkers' respective automated assistants to engage with the coworkers. Assuming the answer is yes, automated assistant liaison service 138 may trigger the coworkers' automated assistants to solicit responses to Dave's question from the coworkers.

Figure 3B:
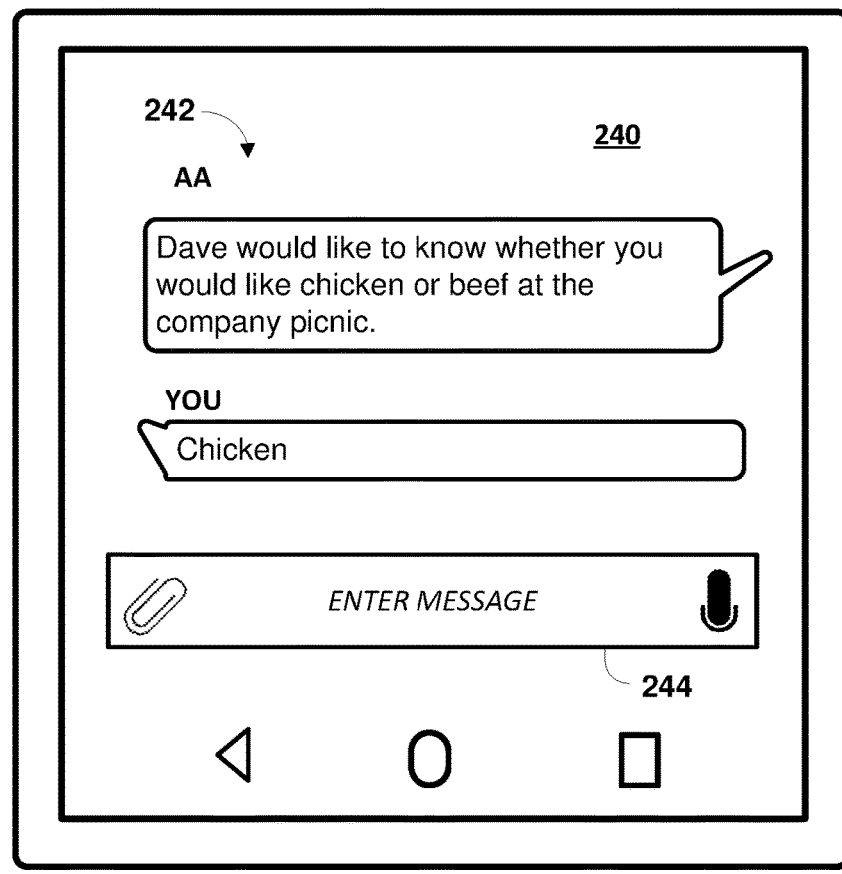

An example of what one of the other coworkers (Sarah from the previous example) may see is depicted in FIG. 3B. On Sarah's client device 206B, Sarah's automated assistant 120, e.g., at the behest of automated assistant liaison service 138, provides the following natural language output: "Dave would like to know whether you would like chicken or beef at the company picnic." Sarah ("YOU") responds, "Chicken." In various implementations, Sarah's response, as well as responses from others of Dave's coworkers, may be collected, e.g., by automated assistant liaison service 138 and/or by Dave's automated assistant 120. In some implementations, automated assistant liaison service 138 and/or Dave's automated assistant 120 may wait until it has responses from all of the other coworkers, or until some predetermined deadline (e.g., one day prior to the company picnic as determined from Dave's schedule), until Dave is presented the results. This is shown in FIG. 3A, when Dave's automated assistant 120 outputs, at 384 (which as indicated by the ellipses occurs sometime later), the polls results, "Sarah, Marshall, Ed, and Stan would prefer chicken. Sally and Ernest would prefer beef." While each coworker received Dave's solicitation as a natural language output, this is not intended to be limiting. In some implementations, one or more of Dave's co-workers could have received the solicitation in a different form, such as a text message, an email (e.g., that linked to a survey with the choices "chicken" and "beef"), etc.

One technical advantage of being able to poll multiple individuals via their respective automated assistants is that instead of Dave receiving multiple response (as would have occurred, for instance, had Dave simply texted his coworkers with the question, "Chicken or beef"), Dave receives from his automated assistant 120 a single communication (at 384) that summarizes the results of the poll. Dave is not inundated with multiple responses, which conserves network and computing resources of client device 206A and reduces distractions. It also reduces the number of interactions Dave must engage in with a client device, which may be beneficial if Dave is driving or otherwise unable to provide numerous inputs.

Figure 4A:
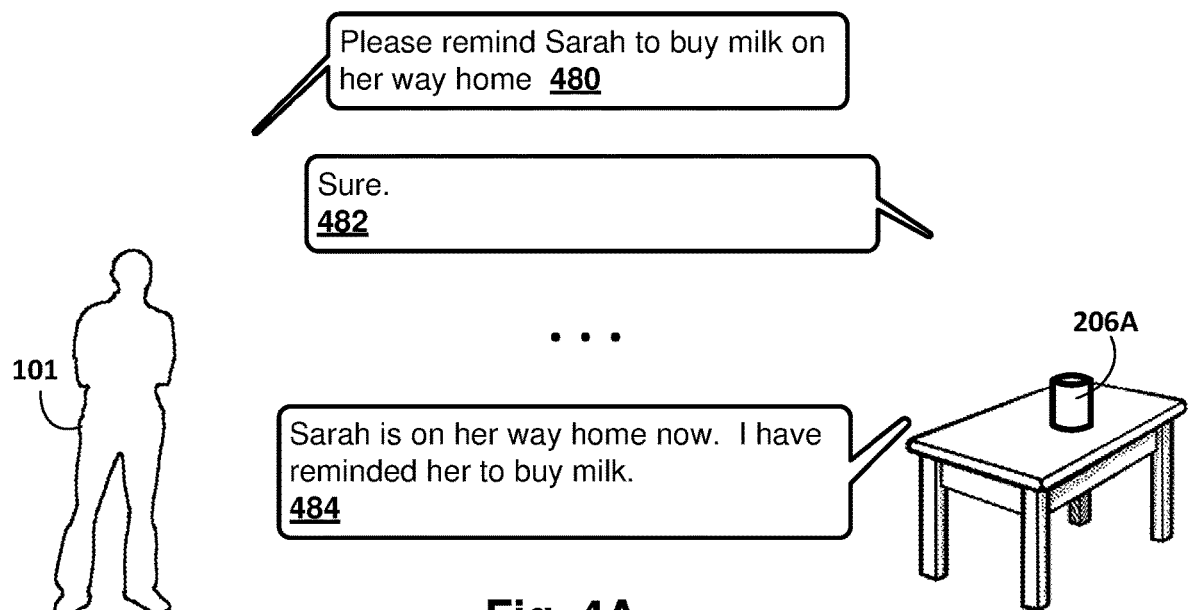
Figure 4B:
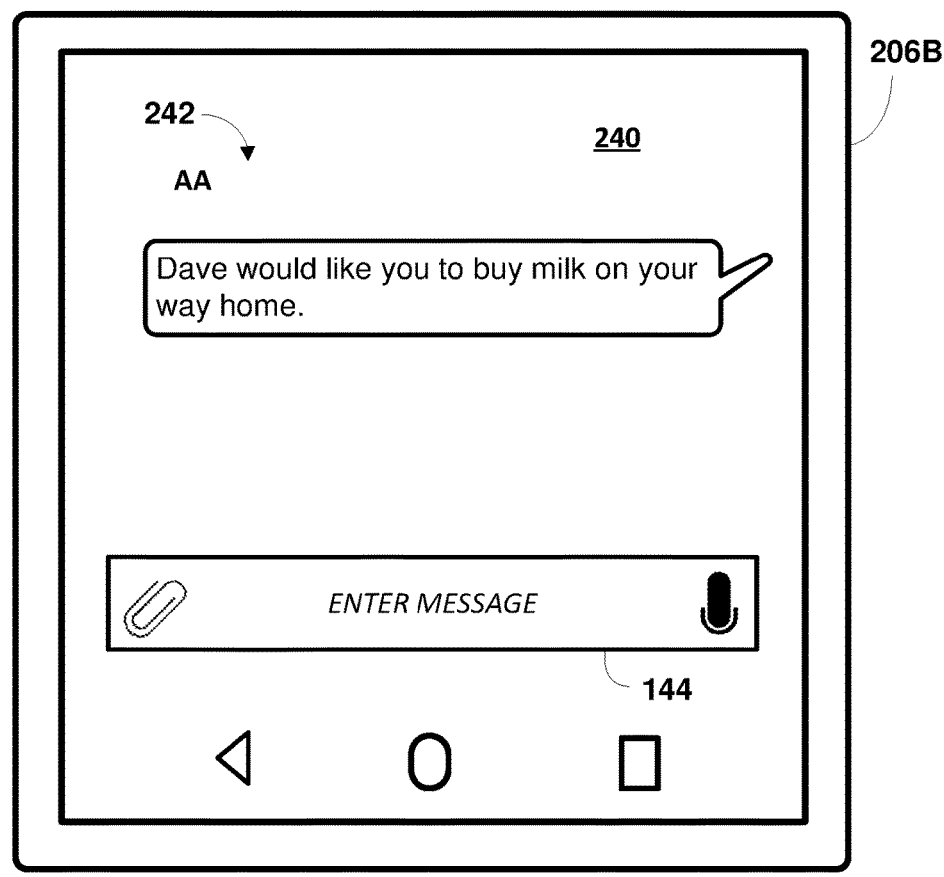

FIG. 4 depicts another dialog between the user Dave 101 and his automated assistant 120 operating on the computing device 206A during a different session, and shows another example of how a user can engage an automated assistant 120 to trigger an automated assistant serving another user to proactively engage that other user. In this example, at 480, Dave 101 provides the natural language input, "Please remind Sarah to buy milk on her way home." Dave's automated assistant 120 responds, "sure." At this point, Dave's automated assistant 120 may engage automated assistant liaison service 138 and/or another automated assistant that serves Sarah, e.g., by way of Sarah's client device 206B, and cause Sarah's automated assistant to provide the output, "Dave would like you to buy milk on your way home." In some implementations, this output may be provided on Sarah's client device 206B by Sarah's automated assistant when it is determined, e.g., based on Sarah's location as tracked by location service 136, that Sarah is on her way home. In other implementations, it may be provided to Sarah immediately. In some implementations, if Dave's automated assistant has, by way of access control list 126, permission to obtain Sarah's location from location service 136, Dave's automated assistant 120 may be automatically informed, e.g., by way of location service 136 triggering Dave's own automated assistant, when Sarah is on her way home. In some such implementations, Dave's automated assistant may provide, at 484, output such as "Sarah is on her way home now. I have reminded her to buy milk."

Figure 5:
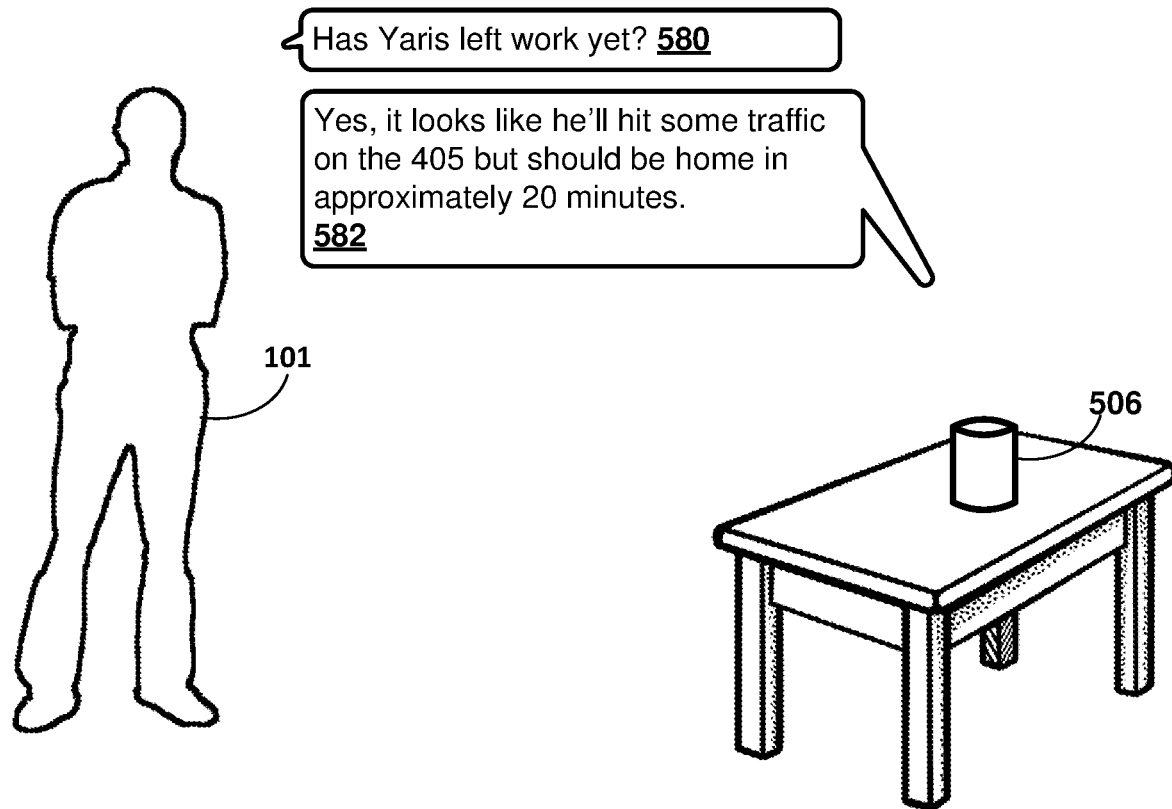

FIG. 5 depicts another example human-to-computer dialog between the user Dave 101 and an instance of automated assistant 120 operating on Dave's client device 206A. Dave asks at 580, "Has Yaris left work yet?" Dave's automated assistant 120 may communicate with user-controlled resources engine 130, and in particular with location service 136. It may be determined, e.g., based on access control list 126, that Dave's automated assistant 120 has permission to obtain Yaris' current location. Accordingly, location service 136 may provide Yaris' current location (which may be determined, for instance, from a last position coordinate received from one or more of Yaris' client devices) to Dave's automated assistant 120. Dave's automated assistant may perform further searching and processing, e.g., of current traffic conditions from a mapping service, and may formulate a response at 582 such as "Yes, it looks like he'll hit some traffic on the 405 but should be home in approximately 20 minutes."

Figure 6:
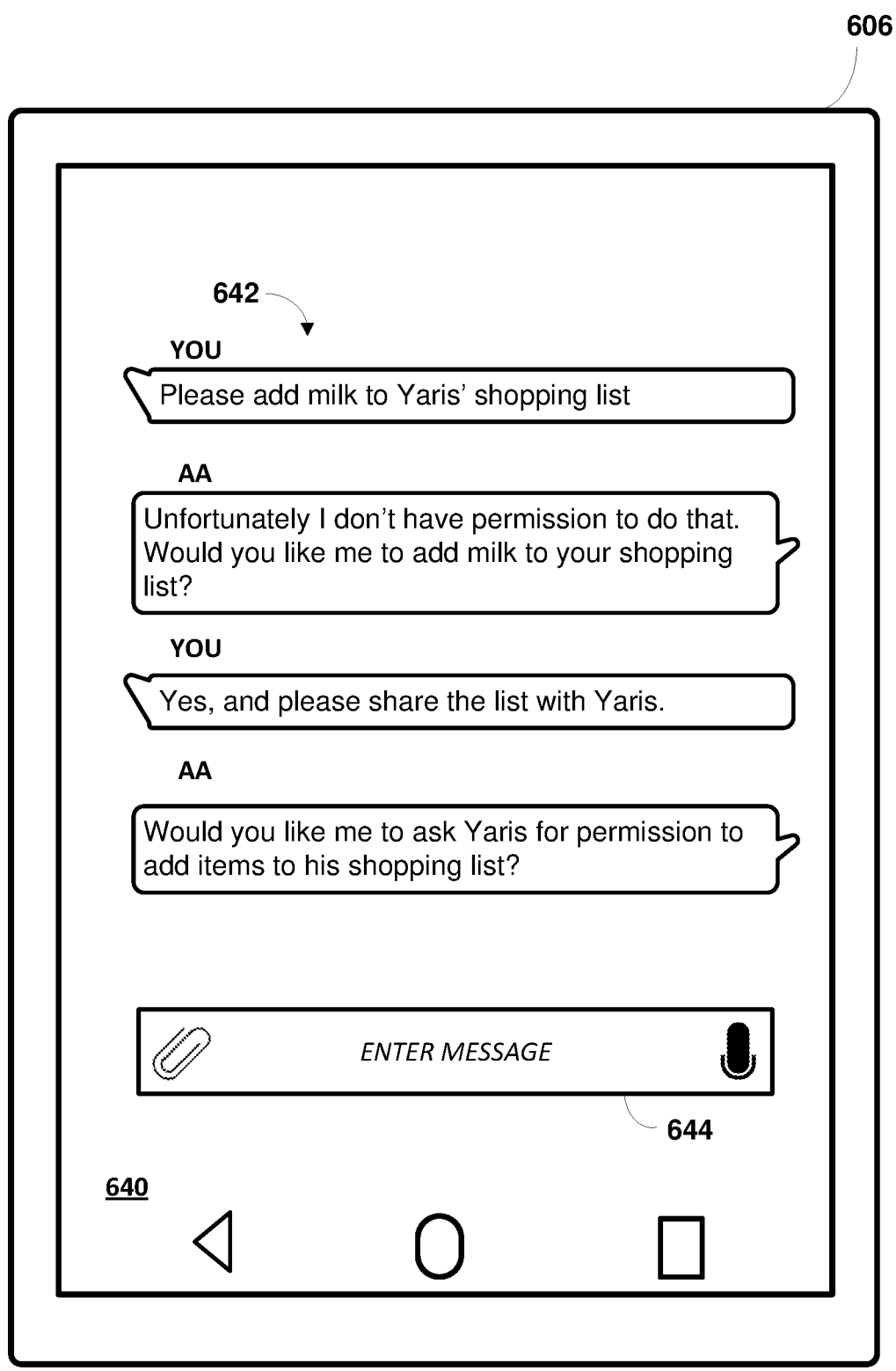

FIG. 6 depicts an example in which a client device 606 in the form of a smart phone or tablet (but that is not meant to be limiting) includes a touchscreen 640. Rendered visually on touchscreen 640 is a transcript 642 of a human-to-computer dialog between a user ("You" in FIG. 6) of client device 606 and an instance of automated assistant 120 ("AA") executing (at least in part) on client device 606. Also provided is an input field 644 in which the user is able to provide natural language content, as well as other types of inputs such as images, sound, etc.

In FIG. 6, the user initiates the human-to-computer dialog session with the question, "Please add milk to Yaris' shopping list." The automated assistant 120 serving the user then engages with user-controlled content engine, and in particular with shopping list service 134, to determine whether, based on access control list 126, the user's automated assistant 120 has permission to add items to Yaris' shopping list. In this example, the user's automated assistant 120 determines that it does not have permission. Accordingly, the user's automated assistant 120 responds, "Unfortunately I don't have permission to do that. Would you like me to add milk to your shopping list?" The user responds "Yes, and please share the list with Yaris." The user's automated assistant may then interact with shopping list service 134 to add milk to the user's own shopping list. The user's automated assistant 120 and/or shopping list service 134 may also update access control list 126 so that an automated assistant serving Yaris now has access to the user's shopping list. While not shown, in some implementations, this may trigger Yaris' automated assistant 120 to inform Yaris that he now has access to the user's shopping list. The user's automated assistant then asks, "Would you like me to ask Yaris for permission to add items to his shopping list?" Should the user respond in the affirmative, the user's automated assistant 120 may engage with automated assistant liaison service 138 to trigger Yaris' automated assistant 120 to ask Yaris if the user can have permission to add items to Yaris' shopping list.

Figure 7A:
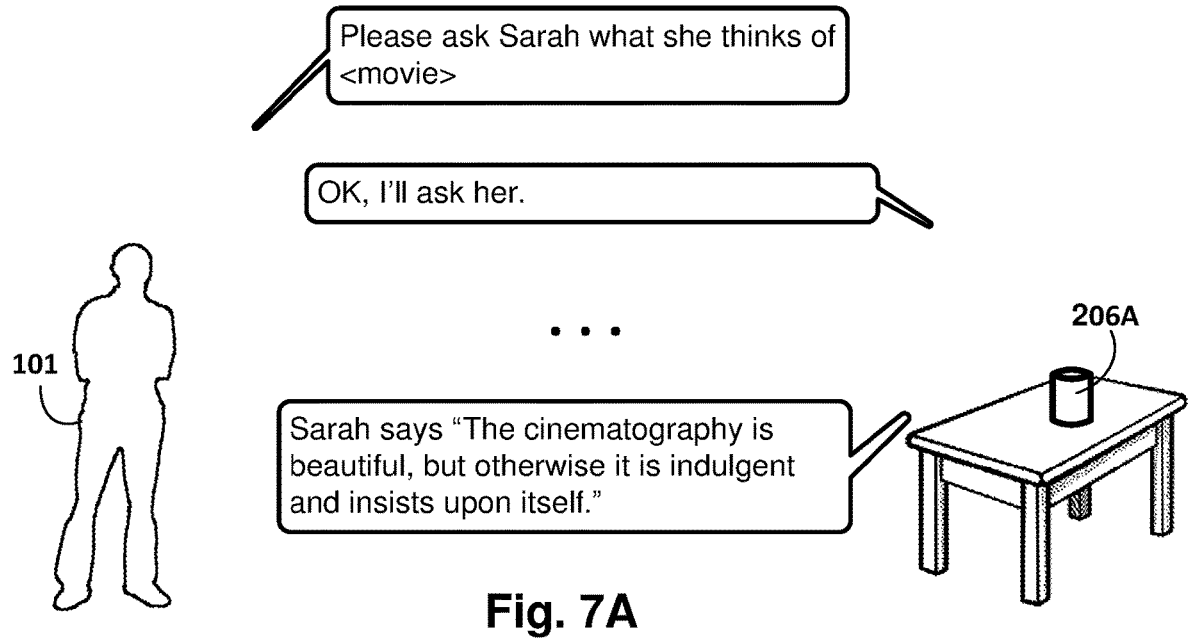
Figure 7B:
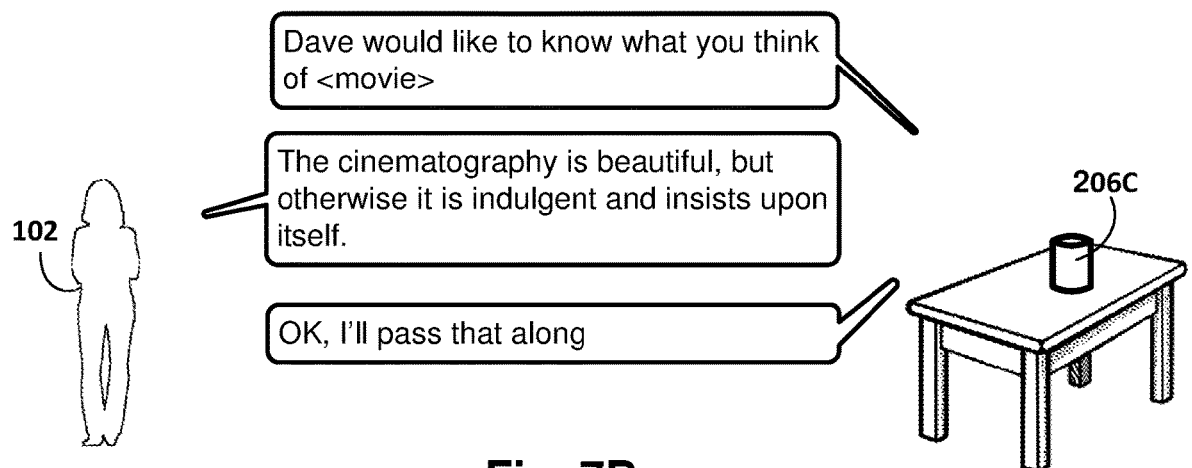

FIGS. 7A and 7B depict another example of how users may, by way of their respective automated assistants, exchange information. In FIG. 7A, a Dave 101 once again interacts with an automated assistant 120 executing at least in part on client device 206A. In this example, Dave 101 provides the natural language input, "Please ask Sarah what she thinks of <movie>." Dave's automated assistant 120 responds, "OK, I'll ask her." Dave's automated assistant 120 then interacts with automated assistant liaison service 138, which determines based on access control list 126 that Dave's automated assistant 120 has permission to trigger Sarah's automated assistant 120 to proactively engage with Sarah.

FIG. 7B depicts one example of how Sarah may be engaged by her automated assistant 120 in this example. Sarah's automated assistant may be executing at least in part on another of Sarah's client devices, 206C, which in FIG. 7B takes the form of a standalone interactive speaker. Sarah's automated assistant 120 audibly outputs the following natural language statement: "Dave would like to know what you think of <movie>." Sarah then responds, "The cinematography is beautiful, but otherwise it is indulgent and insists upon itself." Sarah's automated assistant 120 then states, "OK, I'll pass that along."

Back at FIG. 7A, after some time passes and Sarah provides her opinion about the movie, Dave's automated assistant 120 informs Dave of Sarah's opinion. In this example, the same client device 206A that Dave used to initiate the transaction also provides Dave with this information. However, this is not meant to be limiting. Dave may no longer be in the vicinity of client device 206A, but may be operating another client device (not depicted) that executes at least a part of Dave's automated assistant 120 (e.g., a vehicle computing system). In such a scenario, Dave's other client device may actually output Sarah's opinion, audible or visually.

Figure 8:
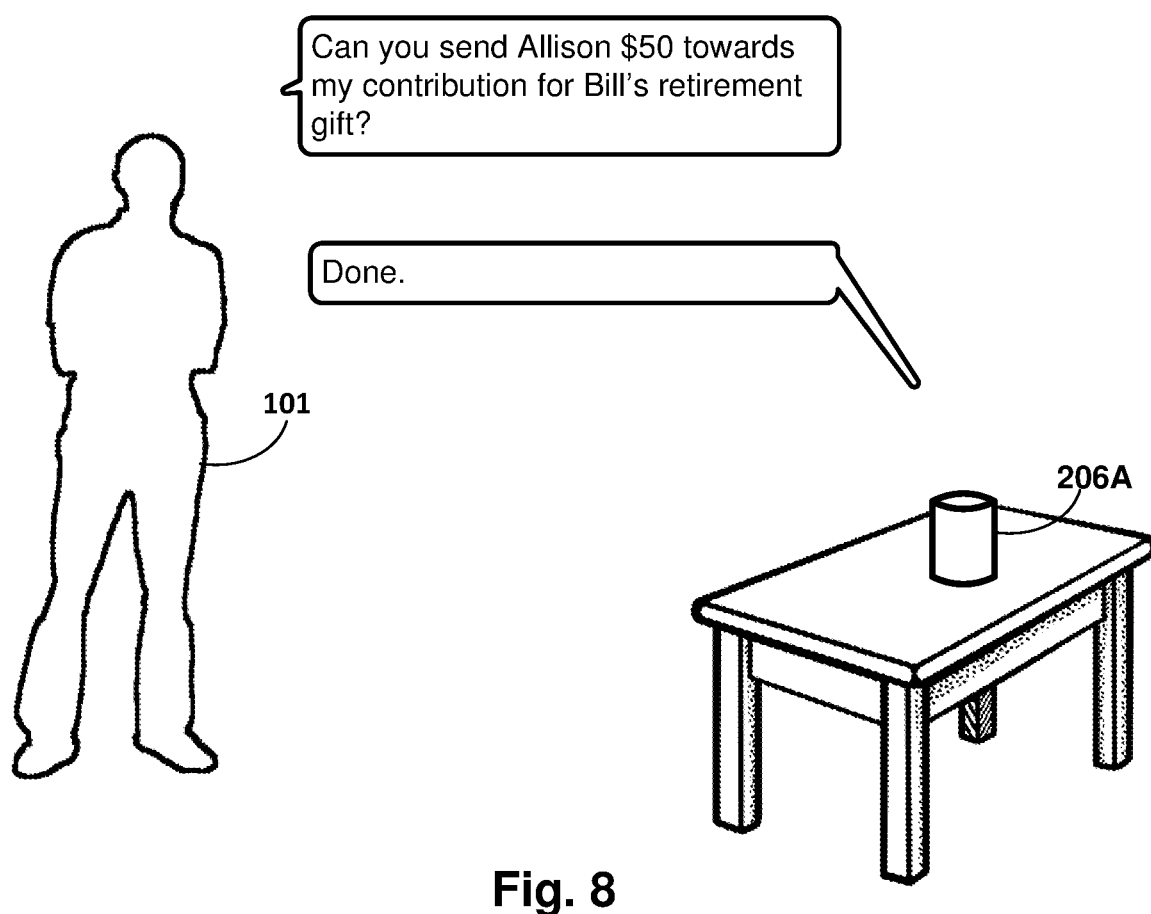

As noted above, the services 130-138 are not an exhaustive list. Other types of services that facilitate other types of transactions, such as payment of funds, are also contemplated. FIG. 8 once again depicts Dave 101 engaging in a human-to-computer dialog with his automated assistant that executes at least in part on client device 206A. In this example, Dave 101 provides the natural language input, "Can you send Allison $50 towards my contribution for Bill's retirement gift?" In response to this input, Dave's automated assistant 120 may engage with a fund payment service (not depicted in FIG. 1) that is connected with Dave's bank account to send the requested funds to another user, Allison. In some implementations, the fund payment service may determine, e.g., based on access control list 126, whether Dave's automated assistant has permission to deposit funds into a bank account controlled by Allison. In other implementations, Dave's automated assistant may simply effect a fund transfer using various conventional online payments systems that facilitate transfer of funds, e.g., via email addresses associated with users.

Figure 9:
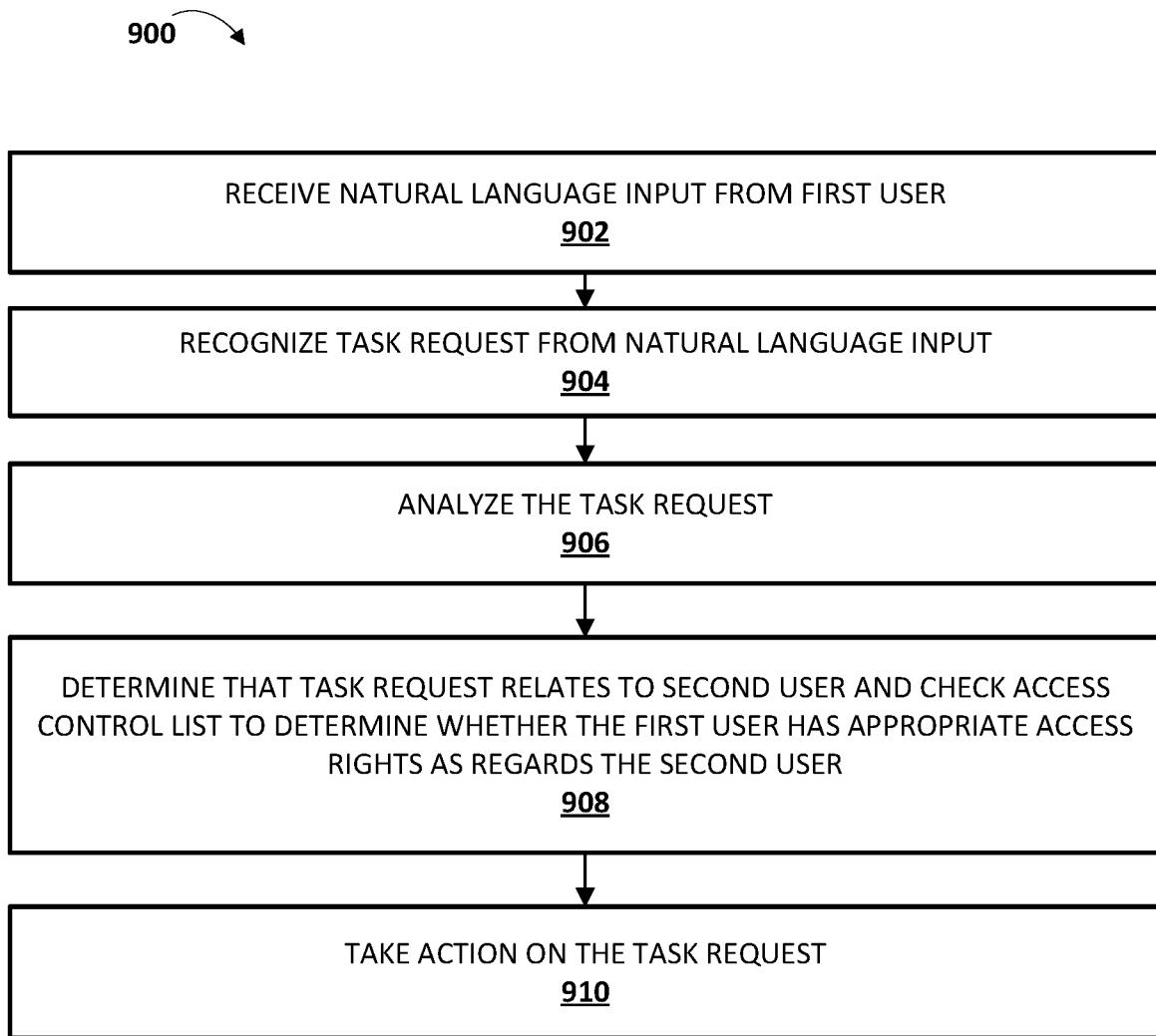
FIG. 9 depicts a flowchart illustrating an example method according to implementations disclosed herein.

FIG. 9 is a flowchart illustrating an example method 900 according to implementations disclosed herein. For convenience, the operations of the flow chart are described with reference to a system that performs the operations. This system may include various components of various computer systems, such as one or more components of automated assistant 120. Moreover, while operations of method 900 are shown in a particular order, this is not meant to be limiting. One or more operations may be reordered, omitted or added.

At block 902, the system may receive a natural language input from a first user. For example, the first user may provide speech input that is converted to text, e.g., at automated assistant client 118 and/or by one or more cloud-based automated assistant components 119. Additionally or alternatively, the first user may provide natural language input in textual form, e.g. by way of message exchange client 107 or another similar application.

At block 904, the system may recognize a task request from the voice input received at block 902, and at block 906, the system, e.g., by way of natural language processor 122 and/or other cloud-based automated assistant components 119, may analyze the task request (e.g., add annotations, pronoun resolution, entity identification, etc.).

At block 908, and in response to the analysis, the system may determine that the task request relates to a second user and check access control list 126 (which as noted above relates to an automated assistant engaged by the second user) to determine whether the first user has appropriate access rights as regards the second user for action to be taken on at least part of the task request. In some implementations, permissions may be checked on an individual user basis. In some implementations, the system may determine whether the first user has appropriate access rights as regards the second user by determining that the first user is a member of a first group and determining that the first group has appropriate access rights as regards the second user. In various implementations, a task request may include multiple sub tasks or queries, some of which for which permission is governed by access control list 126 and other for which no permission is required. For example, suppose a user submits the task query, "Please add a Tuesday lunch meeting on Ruby's calendar, and then send her a text message about the meeting." Adding an entry to Ruby's calendar may require permission via access control list 126, but sending a generic text message may not. Accordingly, in some implementations, automated assistant 120 may determine portions of task requests that require permissions and portions that do not, and may only consult access control list 126 when necessary.

At block 910, the system may, in response to determining that the first user has appropriate access rights as regards the second user at block 908, take action on the task request. For example, in some implementations, taking action on the task request may include reading information from the second user's account (e.g., from user-controlled resources 128) with a service (e.g., one or more of services 130-138). In some implementations, taking action on the task request may include writing information to the second user's account with a service. In some implementations, this reading and/or writing may be performed by an automated assistant associated with (e.g., serving) the first user and/or an automated assistant associated with (e.g., serving) the second user.

Figure 10:
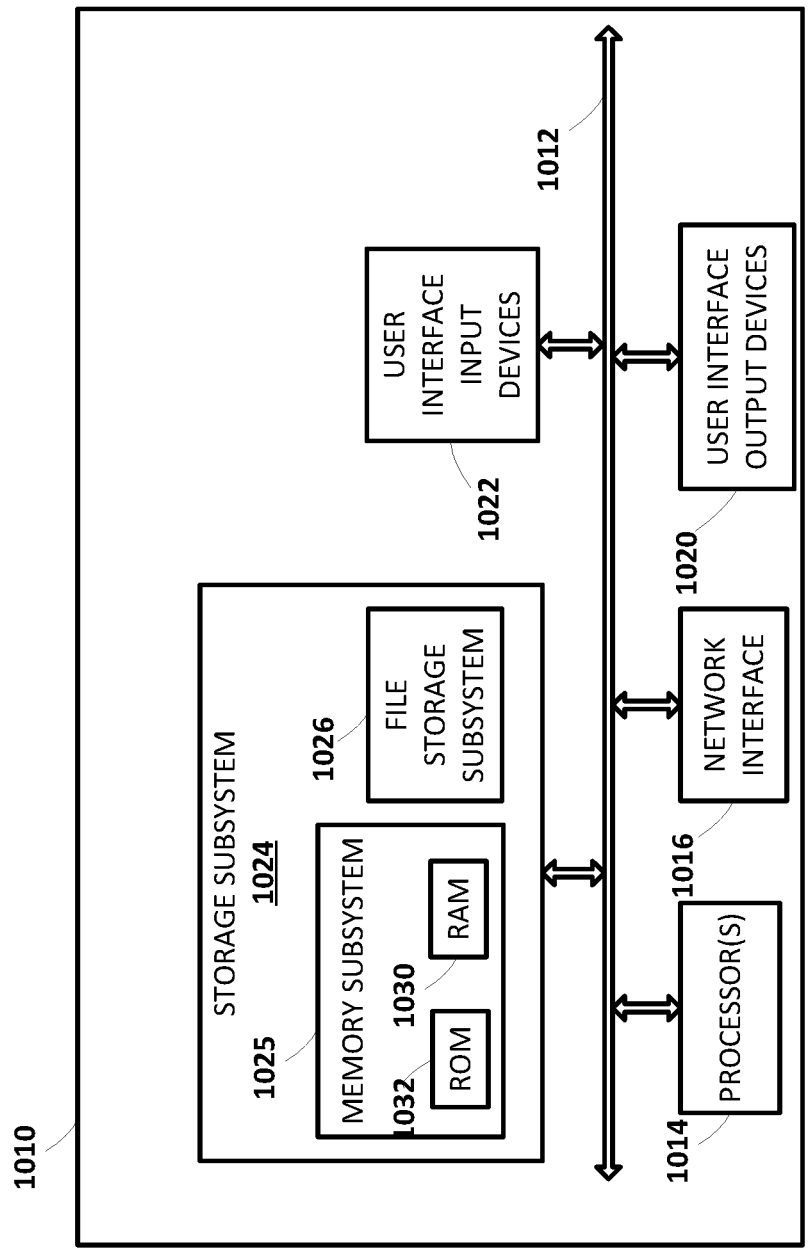
FIG. 10 illustrates an example architecture of a computing device.

FIG. 10 is a block diagram of an example computing device 1010 that may optionally be utilized to perform one or more aspects of techniques described herein. In some implementations, one or more of a client computing device, user-controlled resources engine 130, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the method of FIG. 9, as well as to implement various components depicted in FIG. 1.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

Figure 11:
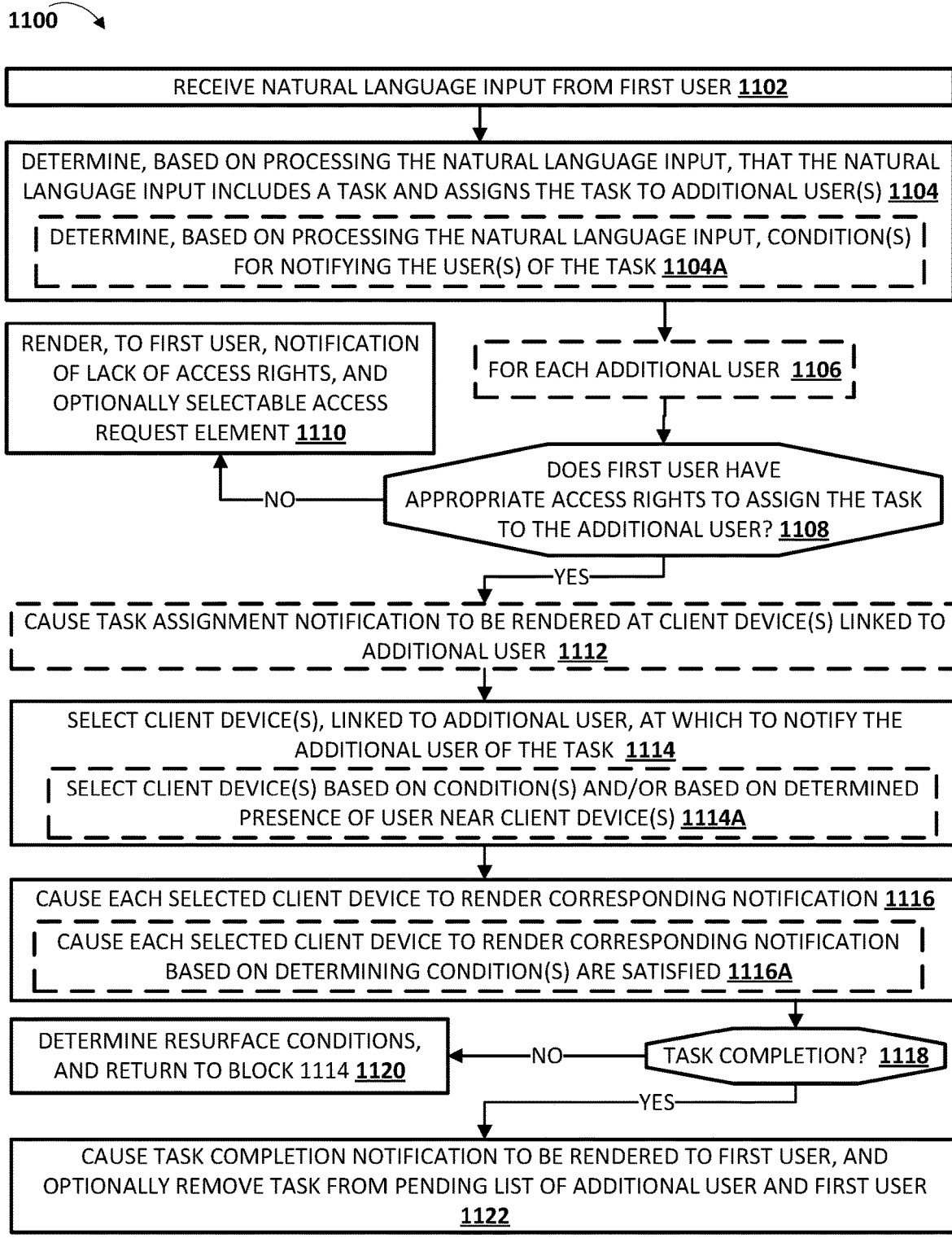
FIG. 11 depicts a flowchart illustrating another example method according to implementations disclosed herein.

FIG. 11 is a flowchart illustrating an example method 1100 according to implementations disclosed herein. For convenience, the operations of the flow chart are described with reference to a system that performs the operations. This system may include various components of various computer systems, such as one or more components of automated assistant 120. Moreover, while operations of method 1100 are shown in a particular order, this is not meant to be limiting. One or more operations may be reordered, omitted or added.

At block 1102, the system receives a natural language input from a first user. For example, the first user can provide speech input that is converted to text, e.g., at automated assistant client 118 and/or by one or more cloud-based automated assistant components 119. Additionally or alternatively, the first user can provide natural language input in textual form, e.g. using a virtual keyboard or physical keyboard.

At block 1104, the system determines, based on processing the natural language input, that the natural language input includes a task and that the natural language input assigns the task to additional user(s). For example, the system can utilize natural language processor 122 and/or other cloud-based automated assistant components 119, in processing text of the natural language input to determine that it includes the task and that it assigns the task to one or more additional users.

In some implementations, the natural language input assigns the task to a single user. For example, the natural language input can be "remind Sara to fill in details in the spreadsheet", and assign the task of "fill in details in the spreadsheet" to a single user, "Sara".

In some other implementations, the natural language input assigns the task to multiple users. In some versions of those other implementations, the multiple users can be identified individually in the natural language input, such as in natural language input of "remind Sara and Joe to fill in details in the spreadsheet". In some other versions, the natural language input can identify the multiple users with a group alias, and the multiple users can be resolved utilizing a stored mapping of the group alias to the multiple users. For example, for the natural language input of "remind the patent team to fill in details in the spreadsheet", the alias "patent team" can be mapped to five different users. The mapping can be, for example, in a contacts database that is personal to the first user, or in an organization's contact database that is accessible to the first user. As another example, for the natural language input of "remind the kids that tomorrow is school picture day", the alias "kids" can be mapped to a first kid and a second kid of the first user. The mapping can be, for example, in a contacts database that is personal to the first user, or a database for a family account that is accessible to the first user, the first kid, the second kid, and optionally other individual(s) authorized as members of the family account. The family account can optionally be associated with a device topology described herein, and the alias(es) of a group and/or individual members of the group can be linked to assistant client device(s) of the device topology.

More generally, additional user(s), to which a user can assign task(s), can be determined and/or associated with the user utilizing various technique(s). For example, an additional user can be determined and/or associated with the user based on: being stored as a contact of the user (e.g., on a mobile phone of the user); being logged into the same assistant device(s) as the user; being a member of the same family account as the user; and/or being indicated, by user interface input of the user, as being an acquaintance of the user and/or being related to the user. In some of those implementations, explicit permission from the additional user is required prior to the user being able to assign task(s) to the additional user. For example, a graphical and/or audible prompt can be rendered at a client device of the additional user, and an affirmative response, from the additional user and to the prompt, required before the user can assign task(s) to the additional user. Also, in various implementations an additional user can (e.g., through user interface input(s) at a control interface) revoke the ability of the user to assign task(s) to the additional user.

In some implementations, block 1104 includes sub-block 1104A. At sub-block 1104A, the system also determines, based on processing the natural language input, one or more conditions for notifying the additional user(s) of the task. The condition(s) can include, for example, locational condition(s), temporal condition(s), and/or activity condition(s).

A locational condition can optionally include an environment, or an area within the environment, that is resolvable with reference to a device topology or other data structure linked to an additional user to whom the task is assigned. For example, a device topology of a user can define a "home" environment that includes defined areas such as "living room", "kitchen", "office", "basement", "upstairs", "master bedroom", and/or other area(s). The device topology of the user (or a separate device topology of the user) can optionally define an additional environment, such as "work" or "vacation home", and that environment can optionally have their own defined areas.

One example of a user input with a locational condition that includes an environment can be "remind John when he gets to the vacation home to make sure the valve to the water spigot is shut off". As described below, in such an example, a notification of the task of "make sure the valve to the water spigot is shut off" can be provided based on determining that "John" is "at the vacation home". In some implementations, John's presence at the vacation home can be based on comparing GPS and/or other locational data, from a mobile device of John, to a location assigned (e.g., in a device topology) to the vacation home and/or based on detecting connection of John's mobile device to a Wi-Fi network assigned (e.g., in a device topology) to the vacation home. In some additional or alternative implementations, John's presence at the vacation home can be based on determining that John is present near one or more assistant client devices assigned to the "vacation home" environment in a device topology. For example, John's presence at the vacation home can be determined based on determining, locally at an assistant client device assigned to the "vacation home", that a detected spoken utterance (e.g., detected by microphone(s) of the assistant client device) matches a locally stored voice profile for "John" and/or that vision data (e.g., captured by a camera and/or other vision component of the assistant client device) matches a locally stored facial recognition embedding for "John". Optionally, the assistant client device assigned to the "vacation home" and/or other device(s) assigned to the "vacation home" (e.g., non-transiently in the device topology, or transiently as in the case of a mobile phone) can be selected for rendering the notification based on them being assigned to the environment of the locational condition.

One example of a user input with a locational condition that includes an area in an environment can be "remind John when he's in the kitchen to start the dishwasher". As described below, in such an example, a notification of the task of "start the dishwasher" can be provided based on determining that "John" is "in the kitchen". In some implementations, John's presence in the kitchen can be based on determining that John is present near one or more assistant client devices assigned to the "kitchen" in a device topology.

For example, it can be based on determining, locally at an assistant client device assigned to the "kitchen", that a detected spoken utterance (e.g., detected by microphone(s) of the assistant client device) matches a locally stored voice profile for "John" and/or that vision data (e.g., captured by a camera and/or other vision component of the assistant client device) matches a locally stored facial recognition embedding for "John". Optionally, the assistant client device assigned to the "kitchen" and/or other device(s) assigned to the "kitchen" (e.g., non-transiently in the device topology) can be selected (e.g., exclusively or along with a mobile phone of John) for rendering the notification based on them being assigned to the area, of the environment, of the locational condition.

A locational condition can additionally or alternatively include a point of interest that is not defined in a device topology for a user to whom the task is assigned and/or other data structure directly linked to the user. For example, the point of interest can be a business, a park, a neighborhood, a city, or other area. One example of a user input with a locational condition that includes a point of interest can be "remind John to pick up batteries next time he's at Hypothetical Business", where "Hypothetical Business" references a hypothetical brick and mortar store (or a collection of brick and mortar stores). In some implementations, John's presence at or near (e.g., within a threshold distance of) a location for "Hypothetical Business" can be based on comparing GPS and/or other locational data, from a mobile device of John, to a location assigned to "Hypothetical Business" and/or detecting connection of John's mobile device to a Wi-Fi network assigned to "Hypothetical Business".

A temporal condition can include, for example, a particular time (e.g., 8:00 PM), a time range (e.g., morning, evening, between 5:00 PM and 8:00 PM), a particular date (e.g., tomorrow, this Wednesday), a date range (e.g., this weekend, early next week), and/or combinations thereof. Various techniques can be utilized to resolve "tomorrow", "Wednesday", and/or other inputs to particular dates and/or to resolve "7:00" to AM or PM and/or to an appropriate time zone (e.g., when the first user and an additional user are in different time zones).

An activity condition can include one or more activities of an additional user that are ascertainable based on data from one or more devices linked with the additional user. For example, the activity of driving home from work can be determined based on GPS data from the additional user's mobile phone. Also, for example, the activity of cooking can be determined based on a user's interaction with a client device to access online recipes, data from smart appliances, and/or other data. As with locational condition(s), temporal and/or activity condition(s) can be specified as condition(s) for provisioning of a notification of a task. For example, the input of "tell John to call me on his drive home from work tomorrow" includes a temporal condition of "tomorrow" and an activity condition of "drive home from work", and a notification of the "call me" task can be provided responsive to determining both conditions are satisfied.

At block 1106, the system performs the subsequent blocks, for each additional user determined in block 1104. In some implementations or iterations, this will be only a single user, and in others it will be multiple users. Put another way, at block 1106 the system determines to perform a respective iteration of the subsequent blocks of method 1100, for each of the additional users determined in block 1104. Where there are multiple users and multiple iterations are performed, they can be performed in parallel or sequentially.

At block 1108, the system determines whether the first user (that provided the natural language input are block 1102) has appropriate access rights to assign the task to the additional user being processed. For example, the system can check an access control list 126 (which as noted above relates to an automated assistant engaged by the additional user) to determine whether the first user has appropriate access rights as regards the additional user for action to be taken on at least part of the task request. In some implementations, permissions may be checked on an individual user basis. In some implementations, the system can determine whether the first user has appropriate access rights as regards the additional user by determining that the first user is a member of a group (e.g., a "family" group or a "work group" defined via the automated assistant) and determining that the additional user is also a member of the group. In some of those implementations, the first user and the additional user can be explicitly added to the group, and confirmation from the users can be required for assigning tasks to other users of the group and/or for being assigned tasks by other users of the group.

If, at block 1108, the system determines the first user does not have appropriate access rights to assign the task to the additional user, the system proceeds to block 1110. At block 1110, the system renders, to the first user (e.g., via the client device at which the natural language input is provided at block 1102), a notification of lack of access rights to assign the task to the additional user. Optionally, at block 1110 a selectable access request element is provided that, if selected, will cause an access request to be rendered at client device(s) of the additional user. If, in response to the access request, the additional user confirms that the first user can have access rights to assign tasks, the system can proceed to optional block 1112 or block 1114.

If, at block 1108, the system determines the first user does have appropriate access rights to assign the task to the additional user, the system proceeds to optional block 1112 or to block 1114.

At optional block 1112, the system can cause a task assignment notification to be rendered at client device(s) linked to the additional user. The task assignment notification can differ from the notification(s) of the task rendered at block 1116 (described below) and/or can be rendered at alternative client device(s) than those utilized to render the notification(s) of the task at block 1116. In some implementations, the task assignment notification can convey that a task has been assigned, and optionally an alias of the first user that assigned the task, but may not disclose all (or any) details of the task unless the additional user provides further input to cause all details of the task to then be rendered. In some implementations, the task assignment notification can additionally or alternatively be rendered only at a primary device of the additional user, such as a mobile phone linked only to the additional user, without rendering at any additional client device(s) linked to the additional user. Again, block 1112 is optional, and can be omitted in various implementations and/or for various additional users. For example, block 1112 can be omitted if the additional user has opted out of receiving task assignment notifications and/or if the additional user lacks a primary device (e.g., mobile phone) with an automated assistant application for provisioning the task assignment notification.

At block 1114, the system selects client device(s), linked to the additional user, at which to notify the additional user of the task. In some implementations, multiple client devices are linked to the additional user, and the system selects a subset of the multiple client devices. For example, the system can select only a single client device from amongst three or more client devices linked to the user. As another example, the system can select only two client devices from amongst five or more client devices linked to the user. In some implementations, block 1114 includes sub-block 1114A.

At sub-block 1114A, the system selects the client device(s) based on condition(s) determined at block 1104A (if any) and/or based on determined presence of the user near the selected client device(s).

As one example, if the condition(s) include a locational condition specifying an area within an environment, client device(s) that are assigned to that area (e.g., in a device topology) can be selected as device(s) at which to notify the additional user of the task. In some implementations, a primary device of the additional user (e.g., a mobile phone) may additionally be selected under the assumption it will likely be near the user or secured by the user when the user is in the area, or responsive to determining the primary device is actually near the area when the user is in the area. For example, the primary device can be determined to be near the area by detecting, at the primary device and optionally with a threshold strength, a Bluetooth signal or other signal from another device that is assigned to the area in the device topology.

In some implementations that select client device(s) based on a locational condition for providing a task notification, the notification(s) can be sent to such client device(s) prior to the locational condition being satisfied (e.g., before it is determined the additional user in the area of the environment), but not rendered until it is determined the locational condition is satisfied. For example, if the area is a "kitchen", a notification for the task can be sent from a server (that generates the notification) to an assistant client device, that is linked to the additional user and is assigned to the "kitchen", before it is determined the additional user is in the kitchen. The notification can be sent, by the server, with instructions to store the notification, but not render it until the assistant client device locally determines the additional user is present near the assistant device (e.g., determined using local voice recognition and/or local facial recognition). In these and other manners, the notification of the task can be rendered with reduced latency when it is determined the user is present near the assistant device, as the notification is already locally stored at the client device and need not be retrieved on-demand from the server.

As another example of sub-block 1114A, only client device(s) that are determined to be near the additional user can be selected. For example, when the notification is to be provided at a certain time or time range, only those client device(s) determined to be near the additional user at the certain time or time range can be selected. For instance, a client device can be selected based on having locally recognized the additional user temporally proximal to (e.g., within 5 minutes or other threshold of) the certain time or within the time range. Also, for instance, a primary device of the user can be assumed to be near the additional user at the certain time or time range, or actively determined to be based on sensor data indicating it is being held, it is within a user's pocket, it has recently detected presence (e.g., using a presence sensor), and/or it is otherwise being interacted with. Implementations that select only a subset of client devices at which to notify the additional user can conserve resources of the unselected client devices (e.g., since the unselected client devices will not receive and/or render a corresponding notification) and/or can conserve network resources (e.g., since notification(s) may not be transmitted to the unselected client devices).

As another example, even when no condition(s) are specified, only client device(s) that are determined to be near the additional user may be selected. For instance, a client device can be selected based on it being the first client device to recognize the additional user after the first user provided the natural language input at block 1102. In some implementations, determining that an additional user is present near a client device can be based on the client device locally verifying that the additional user is present in vision data captured by a vision sensor of the client device and/or locally verifying that a voice signature of the additional user is present in audio data captured by one or more microphones of the client device. In some implementations, in selecting client device(s), the corpus of client device(s) of the additional user that are available for selection can be specified based on user interface input of the additional user. For example, the additional user can, through input(s) at a control interface, prevent certain client device(s) of the additional user from rendering task notification(s), under all or some condition(s) (e.g., during certain times of day, day(s) of the week, etc.). As another example, through input(s) at the control interface the additional user can specify those client device(s) via which task notification(s) can be automatically rendered, under all or some condition(s).

At block 1116, the system causes each selected client device to render a corresponding notification. In some implementations, the same notification can be rendered at each of the selected client devices. In some other implementations, different notifications can be rendered at different client devices. For example, a client device that lacks any display can render an audible only notification, while a client device that includes a display can render a graphical notification (optionally along with the same audible notification, or a condensed audible notification). A rendered notification can convey the task, and can optionally identify an alias of the first user that assigned the task and/or an alias of the additional user to whom the notification is being rendered. In some implementations and/or for some client devices, notifications can be rendered automatically (i.e., independent of any user input soliciting the notification). For example, a graphical notification can be displayed automatically, optionally after recognizing the additional user (e.g., using facial recognition). Also, for example, an audible notification can be rendered automatically, optionally following a tone or other audible signal to make the audible rendering less jarring to the additional user. In some implementations, a notification of a task is rendered as a follow-up to an assistant response to a user query that is unrelated to the task (see e.g., FIGS. 13C and 14B).

Block 1116 optionally includes sub-block 1116A, where the system causes each selected client device to render a corresponding notification based on determining that condition(s), specified by the first user in the natural language input, are satisfied. For example, the corresponding notifications can be rendered responsive to determining temporal, locational, and/or activity conditions are satisfied.

At block 1118, the system determines whether the task has been completed by the additional user. In some implementations, this can include determining whether the additional user has interacted with an interface element for marking the task as complete (see e.g., FIG. 12C). In some implementations, this can additionally or alternatively include the additional user providing spoken input indicating that the task is completed. In some implementations, this can additionally or alternatively include utilizing one or more implicit signals to determine whether the task has been completed.

If the system determines at block 1118 that the task has not been completed, the system proceeds to block 1120 and determines resurface conditions, then returns to block 1114 and performs blocks 1114 and 1116 based on the resurface conditions. The resurface conditions dictate whether, when, and/or how notification(s) of the task will again be rendered at client device(s) of the additional user. In some implementations, this can be based on settings provided by the first user and/or the additional user. For example, the additional user can prevent notifications of tasks from being rendered more than once, or only being rendered again via certain client device(s) and/or in certain situations. In some implementations, the resurface conditions cause notification(s) of the task to be rendered in a less obtrusive way than the initial rendering. For example, they can cause notification(s) to be rendered via fewer client device(s) than used for the initial rendering or only in a non-automatic manner (where the initial rendering was automatic).

If the system determines at block 1118 that the task has been completed, the system proceeds to block 1122 and causes a task completion notification to be rendered to the first user. The task completion notification can convey the task and/or an alias of the additional user, and can convey that the task was completed. It can be rendered at one or more devices linked to the first user, either automatically or responsive to input of the first user. At block 1118 the task can additionally or alternatively optionally be removed from a pending task list of the additional user and/or the first user. Optionally, this can be contingent on the first user verifying the task is completed (e.g., by selecting a verification UI element presented with the task completion notification).

Reference is made above, and elsewhere herein, to a device topology. Generally, a device topology references a data structure for representing assistant client devices, smart devices (also known as IoT devices), and/or other electronic devices, as well as properties of those devices and links of those devices to corresponding user(s). For example, a user, group of users, an assistant client device, and/or a group of assistant client devices (e.g., all within an environment, such as a home), and/or a group of smart devices can be linked (e.g., in one or more databases) with one another to enable interactions between the linked devices and corresponding user(s). For instance, each of multiple assistant client devices in a household can be linked to each of multiple disparate smart devices in the household to enable any user (or a restricted group of users) to interface with any one of the assistant client devices to interact with any one of the multiple disparate smart devices.

A device topology can be user created, and/or automatically created, and can define various assistant client devices, various smart devices, and properties for each such as identifier(s) for each and/or attribute(s) for each. For example, the identifier(s) for a device can specify a room (and/or other area(s)) of a structure in which the device is located (e.g., living room, kitchen) and/or can specify nickname(s) and/or alias(es) for the device (e.g. couch lamp, front door lock, bedroom speaker, kitchen assistant, etc.). In this manner, the identifiers of devices can be names, aliases, and/or locations of the respective devices that the user is likely to associate with the respective devices.

The device topology representation can further specify one or more device attributes associated with the respective devices. The device attributes for an assistant client device can include, for example, one or more input and/or output modalities supported by the assistant client device and/or preferred smart device(s) to be controlled by assistant client device(s) (e.g., ambiguous smart TV commands received at assistant client device 1 should be assumed to be directed to smart TV 1, whereas they can be assumed to be directed to smart TV 2 for assistant client device 2). For instance, a device attribute for a standalone speaker-only assistant client device can indicate that it is capable of providing audible output, but incapable of providing visual output. Also, for instance, a device attribute for the same standalone speaker-only assistant client device can indicate that lighting control requests that don't specify particular light(s), should be interpreted to pertain to the light(s) assigned to the same room as that assistant client device.

Additional description of implementations of the method 1100 of FIG. 11, and other implementations, are now provided with reference, in turn, to FIGS. 12A, 12B, 12C, 13A, 13B, 13C, 14A, 14B, 14C, 15A, and 15B.

Figure 12A:
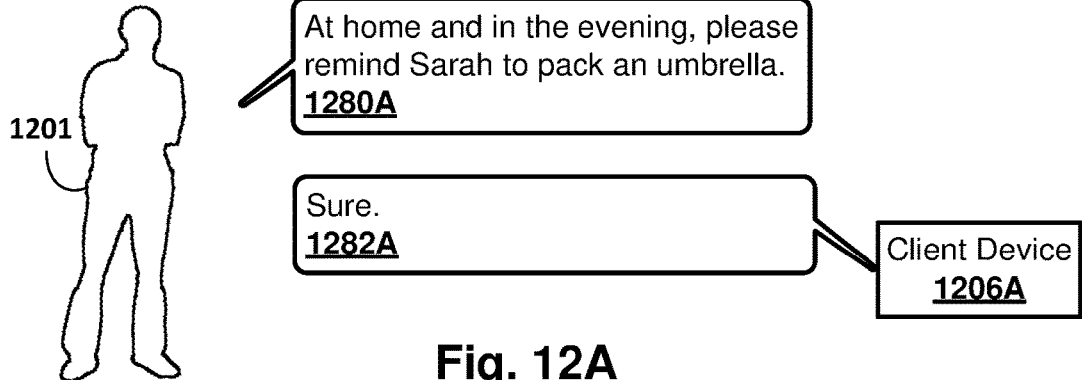
FIGS. 12A, 12B, 12C, 13A, 13B, 13C, 14A, 14B, and 14C depict various examples of assigning tasks to additional user(s) and rendering notification(s) of the task and/or task assignment notification(s) to the additional user(s).

In FIG. 12A, user 1201 ("Dave") provides natural language input 1280A of "At home and in the evening, remind Sarah to pack an umbrella" in a human-to-computer dialog session between the user 1201 and automated assistant 120 via an automated assistant interface of Dave's client device 1206A (e.g., a mobile phone linked only to Dave). In response to the natural language input 1280A, automated assistant 120 processes the natural language input 1280A to determine it includes a task of "pack an umbrella", it is assigned to an additional user 1202 ("Sarah"), and includes a locational condition of "home" and a temporal condition of "evening". Further, automated assistant 120 interacts with user-controlled resources engine 130 to determine that access control list 126 permits Dave to assign tasks to Sarah. Accordingly, Dave's automated assistant 120 (executing at least in part on client device 1206A) may provide responsive natural language output 1382A of "Sure" to indicate to Dave that a notification of the task will be provided to Sarah. The natural language input 1280A can be provided in the morning or early afternoon.

Figure 12B:
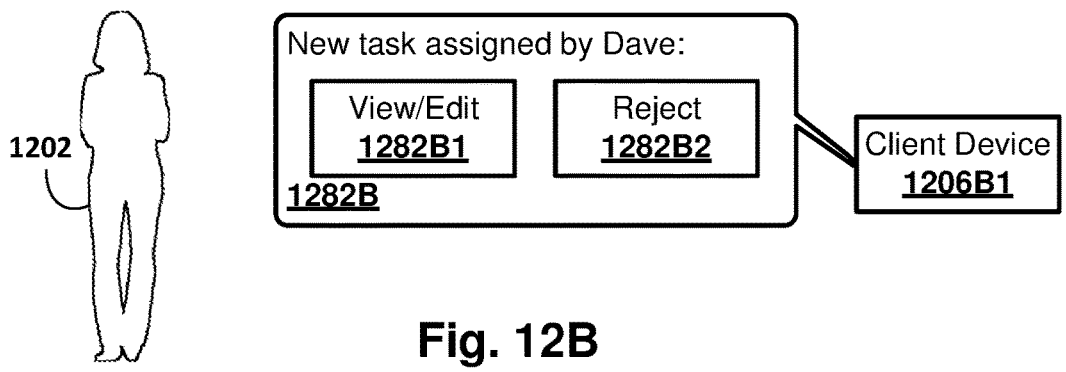

In FIG. 12B, a task assignment notification 1282B is rendered at client device 1206B1, which is linked to user 1202 ("Sarah"). The task assignment notification 1282B can be rendered immediately after the natural language input 1280A (FIG. 12A) has been processed. The client device 1206B1 can be selected for rendering the task assignment notification 1282B based on it being linked with user 1202, and optionally based on it being a primary device of user 1202. The task assignment notification 1282B conveys that a new task has been assigned, and has been assigned by Dave, but does not convey any details on the task. The task assignment notification 1282B also includes a view/edit interface element 1282B1 that can be selected and, if selected, can present a further interface (unillustrated) that enables user 1202 to view more details of the task and optionally to edit the task and/or the condition(s) for the task. For example, if selected the details of the task can include the task itself ("pack your umbrella") and optionally the conditions for the task ("evening" and "at home"). When the further interface enables editing of the task, user 1202 can edit the task (e.g., change the wording) and/or the conditions for the task (e.g., change "evening" to "9:00 PM"). In some implementations, if the user 1202 edits the task, a notification of the editing can be rendered to user 1201 (e.g., via client device 1206A). Further, in some of those implementations the edits will not be effectuated unless the user 1201 confirms those edits responsive to the notification. The task assignment notification 1282B also includes a selectable reject element 1282B2 that can be selected to cause the task to be cleared from a task listing of the user 1202. The particular task assignment notification 1282B is provided as a non-limiting example and additional or alternative task assignment notifications can be provided. For example, task assignment notifications can omit any selectable reject element, while optionally still including a view/edit interface element.

Figure 12C:
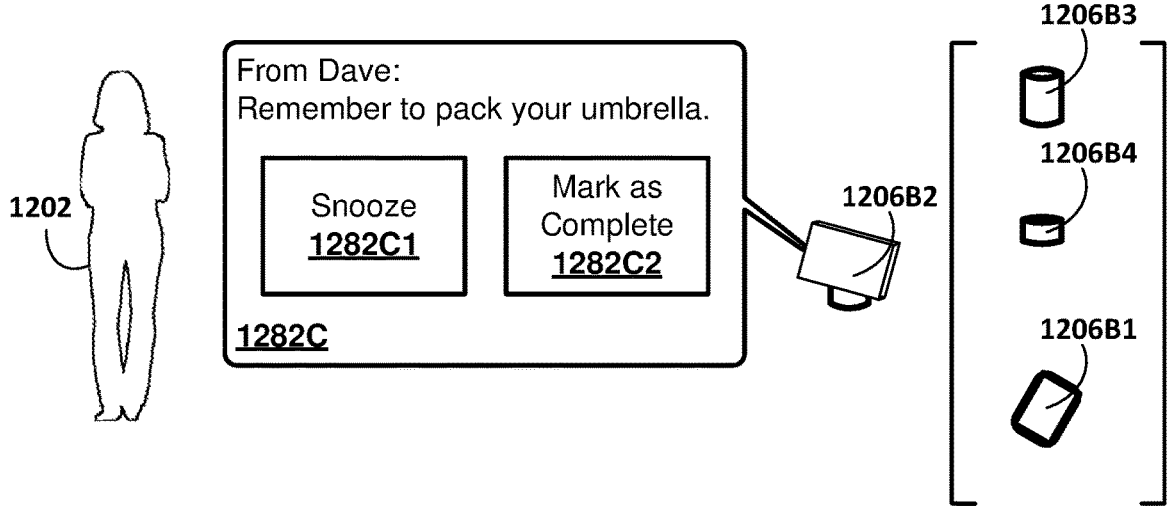

FIG. 12C occurs at a later time than FIG. 12B, and when user 1202 is in a different location relative to her location in FIG. 12B. Namely, in FIG. 12C user 1202 is in a location she has designated as "home" in a device topology representation linked to user 1202, and it is in the "evening". User 1202 is linked to a variety of client devices, including client device 1206B1, as well as client devices 1206B2, 1206B3, and 1206B4. Client devices 1206B2, 1206B3, and 1206B4 all have a non-transient assignment (e.g., only changing responsive to explicit user input to update), in user 1202's device topology, to a "home" environment. Client device 1206B1 is a mobile phone and can optionally have a transient assignment, in the device topology, to the "home" environment (e.g., assigned to "home" when it is detected to be located at the "home"). It is noted that, in the example of FIGS. 12A, 12B, and 12C, user 1202 and user 1201 are not linked to any of the same client devices.

In FIG. 12C the client device 1206B2 renders, visually via a display screen, a notification 1282C of the task. The notification 1282C is rendered based on it being in the "evening" and based on determining that the user 1202 is in a location she has designated as "home" in the device topology. The user 1202 can be determined to be "home" based on data from client device 1206B1, and/or based on client device 1206B2 recognizing user 1202 (e.g., using voice recognition and/or facial recognition) and being assigned to the "home" location in the device topology. Further, in the example of FIG. 12C the client device 1206B2 is selected, from amongst all client devices 1206B1-B5 linked to the user 1202, for rendering of the notification 1282C. This can be based on, for example, determining the user 1202 is near the client device 1206B2, and the notification can be rendered further based on determining the user is near the client device 1206B2. In other implementations, additional client device(s) can also be selected for rendering corresponding notification(s) of the task. In some implementations, a notification can initially be rendered in an obscured manner (e.g., graphically with blurring) or rendered more generically (i.e., with less details) until the additional user, to which the notification is directed, is recognized (e.g., using facial, voice, or other technique(s)), at which point the notification can be rendered without obscurement and/or with more details. In some of those implementations, the obscuring of the notification and/or the more generic initial rendering can be performed responsive to determining that the corresponding task is private. The task can be determined to be private based on explicit input from the indicating user, or processing of the task (e.g., based on natural language understanding of task text and/or based on occurrence of certain term(s) in the task text).

The notification 1282C is rendered visually, and optionally a "ding" or similar tone can also be audibly rendered by the client device 1206B2 to draw the attention of the user 1202 to the display of the client device 1206B2 and/or at least some of the contents of the notification 1282C can also be visually rendered. The notification 1282C can optionally be rendered automatically as described herein.

The notification 1282C conveys the task ("remember to pack your umbrella") and that it has been assigned by Dave. The notification 1282C also includes a selectable snooze element 1282C1 that, when selected, will cause the notification to be snoozed, at which point resurface condition(s) for the notification (or related notification(s)) can be determined as described with respect to method 1100. The notification 1282C also includes a mark as complete element 1282C2 that, when selected, will cause a completion notification to be presented to user 1201 (e.g., via client device 1206A). The user 1202 can additionally or alternatively snooze the task or mark it as complete through corresponding spoken commands.

Figure 13A:
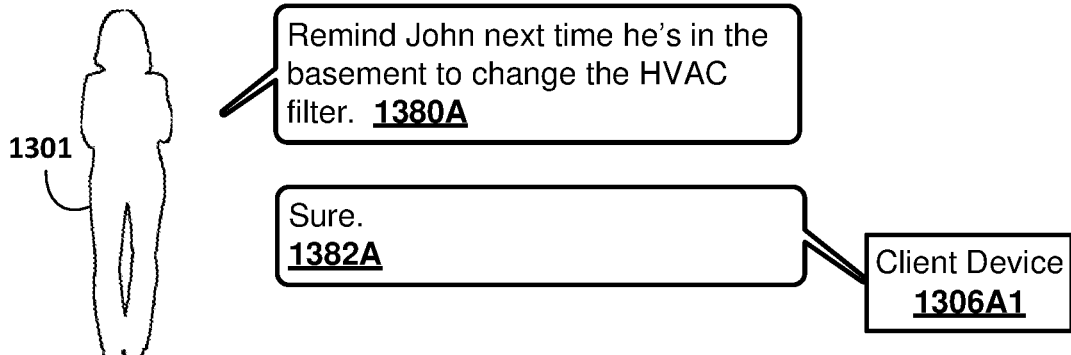

In FIG. 13A, user 1301 ("Jane") provides natural language input 1380A of "Remind John next time he's in the basement to change the HVAC filter" in a human-to-computer dialog session between the user 1301 and automated assistant 130 via an automated assistant interface a client device 1306A1 linked to user 1301. In response to the natural language input 1380A, automated assistant 130 processes the natural language input 1380A to determine it includes a task of "change the HVAC filter", it is assigned to an additional user 1302 ("John"), and includes a locational condition of "basement". Further, automated assistant 130 interacts with user-controlled resources engine 130 to determine that access control list 136 permits user 1301 to assign tasks to user 1302. For example, user 1301 and user 1302 can be spouses and both be linked to the same device topology and/or "family" account. Accordingly, automated assistant 120 (executing at least in part on client device 1306A) may provide responsive natural language output 1382A of "Sure" to indicate to Jane that a notification of the task will be provided to John.

Figure 13B:
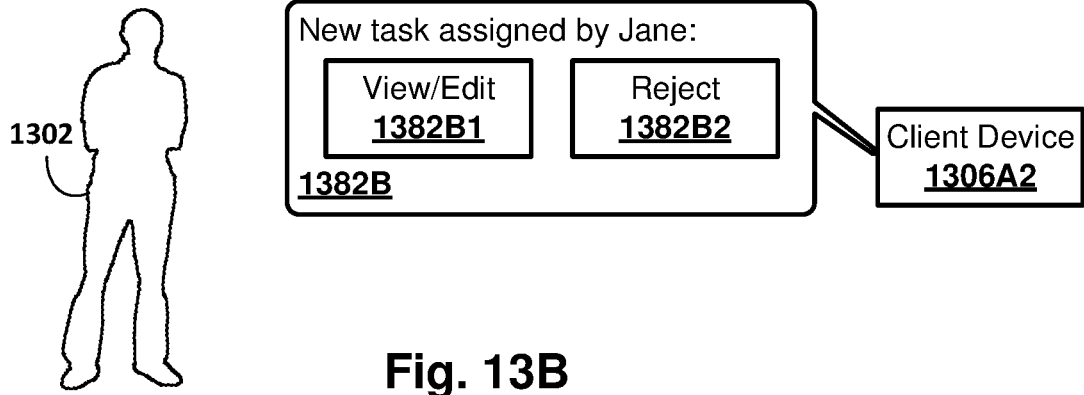

In FIG. 13B, a task assignment notification 1382B is rendered at client device 1306A2, which is linked to user 1302 ("John"). The task assignment notification 1382B can be rendered immediately after the natural language input 1380A (FIG. 13A) has been processed. The task assignment notification 1382B conveys that a new task has been assigned, and has been assigned by Jane, but does not convey any details on the task. The task assignment notification 1382B also includes a view/edit interface element 1382B1 that can be selected and, if selected, can present a further interface (unillustrated) that enables user 1302 to view more details of the task and optionally to edit the task and/or the condition(s) for the task. The task assignment notification 1382B also includes a selectable reject element 1382B2 that can be selected to cause the task to be cleared from a task listing of the user 1302. The particular task assignment notification 1382B is provided as a non-limiting example and additional or alternative task assignment notifications can be provided. For example, task assignment notifications can omit any selectable reject element, while optionally still including a view/edit interface element.

Figure 13C:
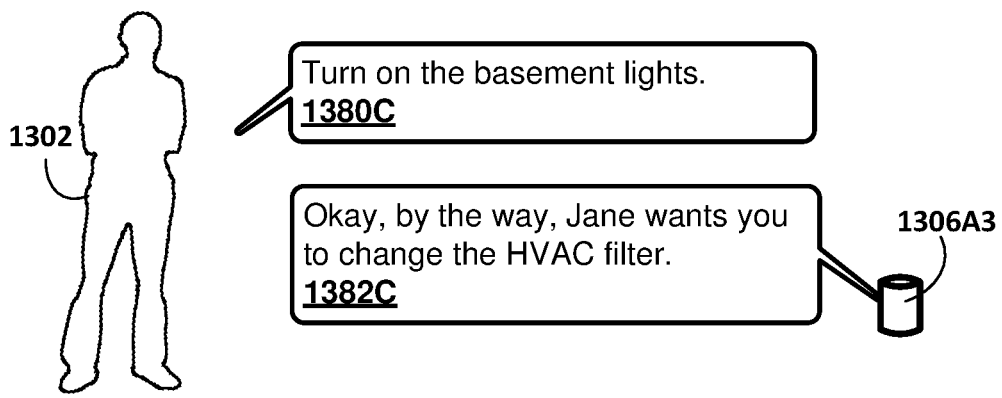

FIG. 13C occurs at a later time than FIG. 13B, and when user 1302 is in a "basement" area in his "home" environment of a linked device topology. Client device 1306A3 has a non-transient assignment, in the device topology shared by users 1301 and 1302, to a "basement" area. User 1302 provides spoken natural language input 1380C of "Turn on the basement lights" that is detected by client device 1306A3, and processed by automated assistant 120 to cause corresponding "basement" smart lights to be transitioned to an "on" state. Further, in response to recognizing that the spoken natural language input 1380C was provided by user 1302 ("John"), the assistant 120 can determine the "locational" condition of the task request of FIG. 13A is satisfied. In response, the response 1382C of the assistant 120 includes not only an acknowledgment ("Okay") of the lights being turned on, but also includes a notification of the task ("Jane wants you to change the HVAC filter"). The notification of the task can be provided via the client device 1306A3 responsive to determining the user is present near the client device 1306A3, and optionally based on determining the client device 1306A3 is assigned to the "basement" of the locational condition. In some implementations, the notification of the task can, in addition to notifying the user of the task (e.g., "Jane wants you to change the HVAC filter), be provided with additional information and/or additional interface element(s) for enabling the additional user to complete the task more quickly. For example, a selectable link to an explanatory video for changing HVAC filters and/or a link to explanatory instructions can be provided. As another example, a selectable element that, when selected, automatically orders additional HVAC filter(s) can be provided. As yet another example, for a notification of a task of "call mom", an interface element can be provided that, when selected (e.g., through touch input or voice input), automatically calls "mom".

Figure 14A:
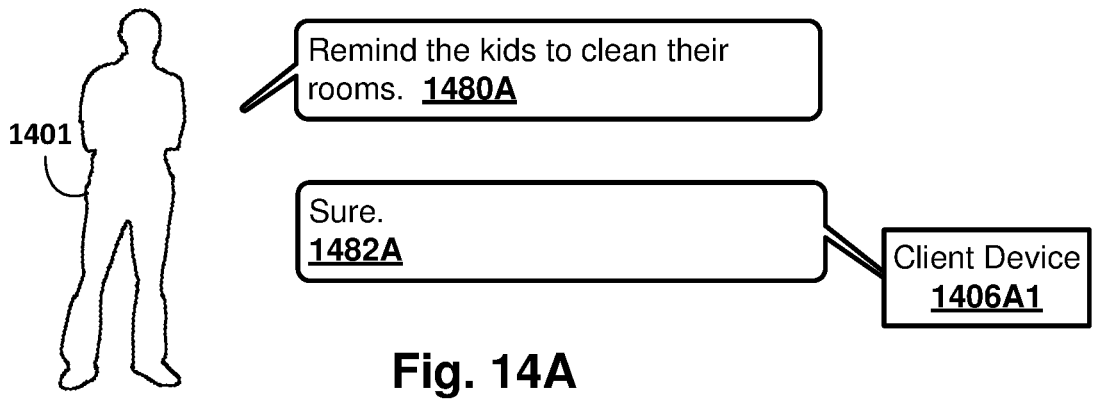

In FIG. 14A, user 1401 ("Dad") provides natural language input 1480A of "Remind the kids to clean their rooms" in a human-to-computer dialog session between the user 1401 and automated assistant 120 via an automated assistant interface a client device 1406A1 linked to user 1401. In response to the natural language input 1480A, automated assistant 140 processes the natural language input 1480A to determine it includes a task of "clean your room", it is assigned to a first additional user 1402 ("Jack") and a second additional user 1403 ("Jill") that constitute the members of the "kids" group for user 1401. Further, automated assistant 120 interacts with user-controlled resources engine 140 to determine that access control list 146 permits user 1401 to assign tasks to users 1402 and 1403. For example, users 1401, 1402, and 1403 can be linked to the same device topology and/or "family" account. Accordingly, automated assistant 120 (executing at least in part on client device 1406A) may provide responsive natural language output 1482A of "Sure" to indicate to Dad that a notification of the task will be provided to his kids.

Figure 14B:
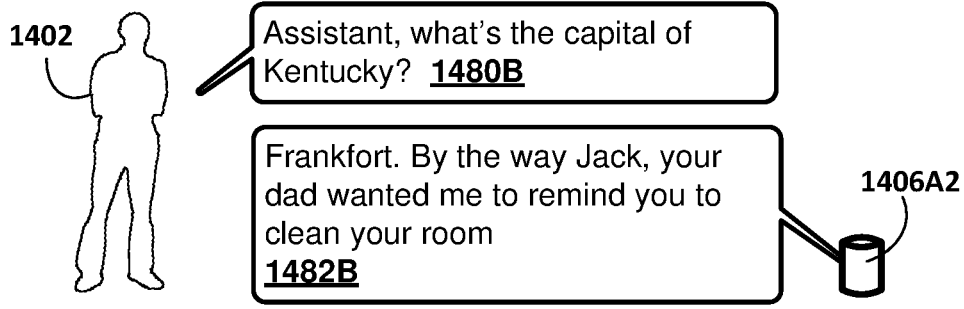

FIG. 14B occurs at a later time than FIG. 14A, and when user 1402 provides spoken natural language input 1480C of "Assistant, what's the capital of Kentucky?" that is detected by client device 1406A2, and processed by automated assistant 120 to cause a response 1482B2 to be provided that includes an answer of "Frankfort". Further, the assistant 120 can also include, in the response 1482B, a notification of the task ("clean your room") and a source of the task ("dad"). The notification of the task can be provided via the client device 1406A3 responsive to determining the user 1402 is present near the client device 1406A2 (e.g., using local speaker recognition), and optionally based on determining that a notification of the task of FIG. 14A has yet to be provided to the user 1402.

Figure 14C:
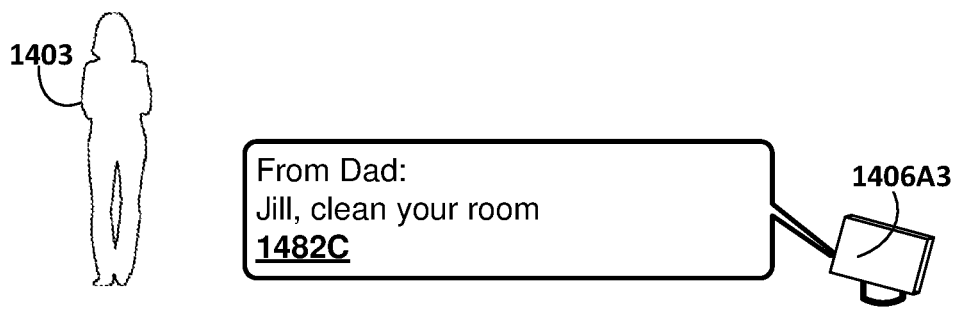

FIG. 14C occurs at a later time than FIG. 14B, and includes a notification 1482C of the task of FIG. 14A, that is visually displayed by a display of client device 1406A3. The notification 1482C can be provided via the client device 1406A3 responsive to determining the user 1403 is present near the client device 1406A3 (e.g., using local facial recognition), and optionally based on determining that a notification of the task of FIG. 14A has yet to be provided to the user 1403.

Figure 15A:
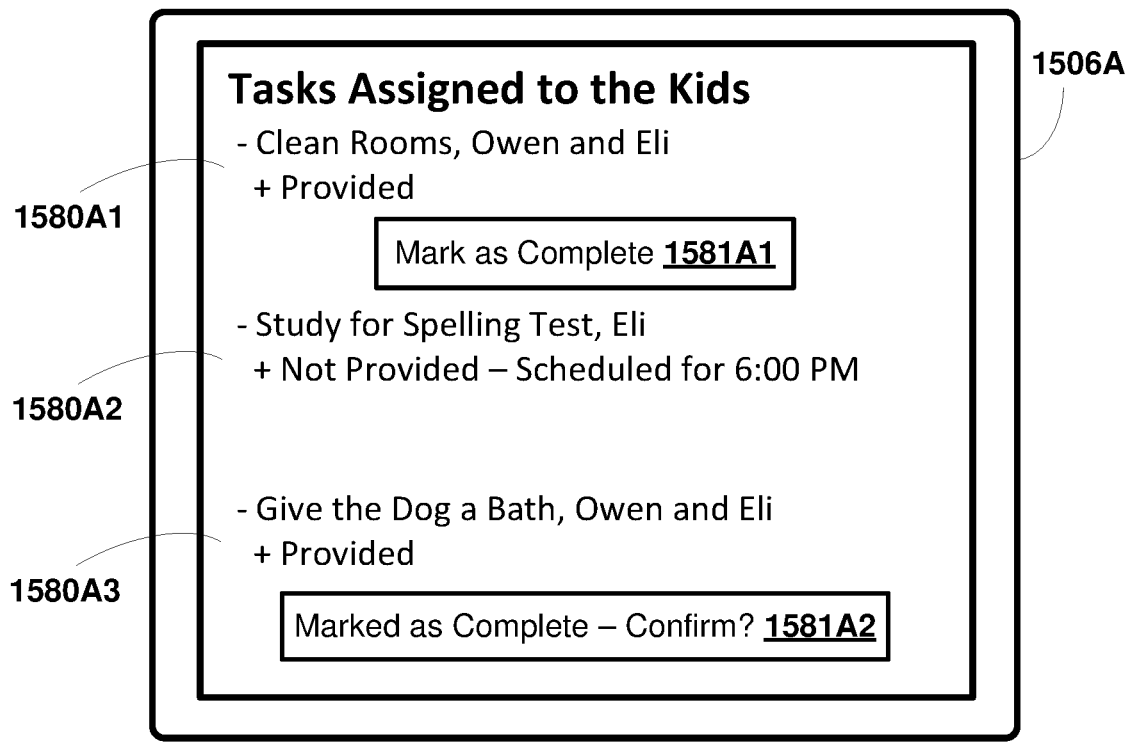
FIG. 15A depicts an example of an interface that can be rendered for a user to view and/or interact with tasks assigned by the user to additional users.

FIG. 15A depicts an example of an interface 1506A that can be rendered for a user to view and/or interact with tasks assigned by that user to additional users. In some implementations, the interface 1506A can be rendered responsive to a spoken utterance, of the user, of "show me tasks that I've assigned to the kids", or a similar utterance. For example, the user can be identified based on voice recognition, tasks that have been assigned by that user to members of the "kids" group identified, and the interface 1506A rendered based on data for such tasks. The interface 1506A includes descriptions 1580A1, 1580A2, and 1580A3 of respective outstanding tasks. Description 1580A1 indicates a corresponding task ("clean rooms"), which of the "kids" it is assigned to ("Owen and Eli"), and an indication that a notification of that task has already been provided. Further, it includes a completion element 1581A1, that can be selected to clear the task from the assigned task queue. In some implementations, the completion element 1581A1 can include an option to specify the additional user(s) that completed the task. In some of those implementations, the additional user(s) can include a user to whom the task is not assigned. For example, a "clean the kitchen" task can be assigned to "Eli" only, but actually completed by "Owen", and "Owen" specified as the additional user that completed that task.

Description 1580A2 indicates a corresponding task ("study for spelling test"), which of the "kids" it is assigned to ("Eli" only), an indication that a notification of that task has yet to be provided ("not provided"), and an indication of the temporal condition for providing the notification ("6:00"). Description 1580A3 indicates a corresponding task ("give the dog a bath"), which of the "kids" it is assigned to ("Owen and Eli"), and an indication that a notification of that task has already been provided. Further, it includes a completion confirmation element 1581A2, that can be selected to confirm a completion indicated by user interface input of one or both of the kids, to thereby clear the task from the assigned task queue. When a task is assigned to multiple additional users, it can be considered completed when any one additional user completes the task or only when multiple (e.g., all additional users) completes the task. Which completion conditions are utilized can be specified by the creating user, or determined automatically based on processing of the task (e.g., natural language processing). As one example, a task of "pick up takeout" can be assigned to multiple additional users, and considered completed once any one of the additional users indicates it as complete. On the other hand, a task of "pack bag for trip" can be assigned to multiple users, and considered completed only after all of the additional users have indicated it as complete.

Figure 15B:
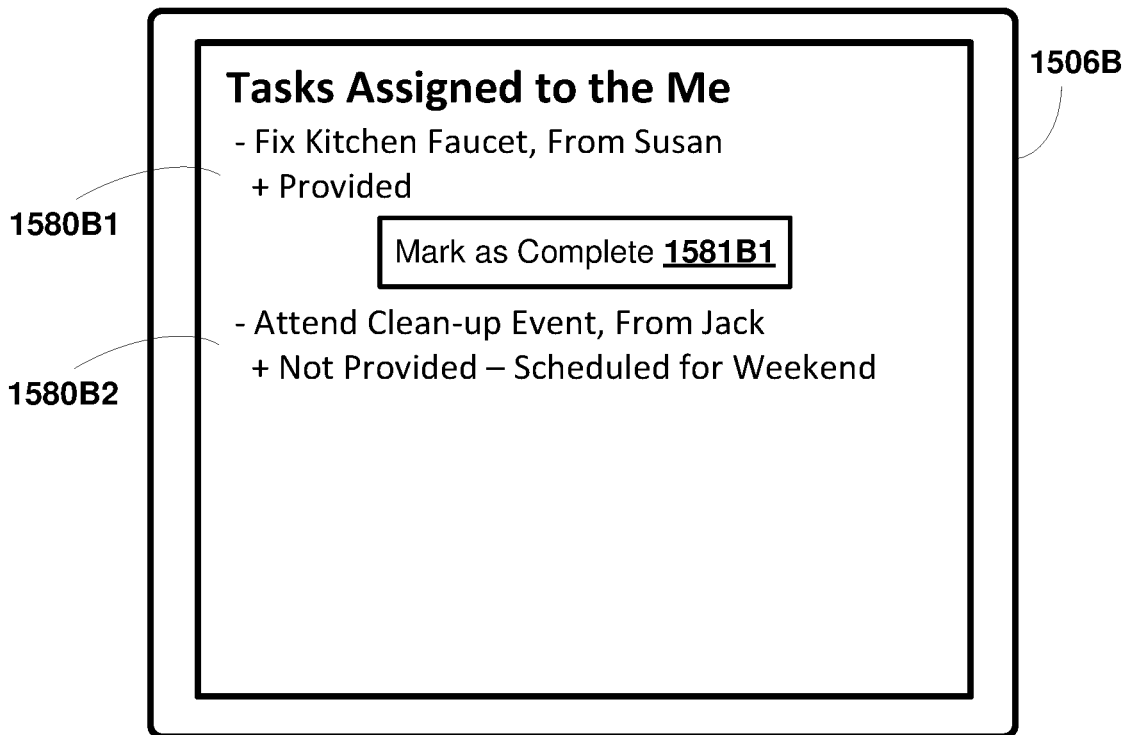
FIG. 15B depicts an example of an interface that can be rendered for a user to view and/or interact with tasks assigned to the user by additional users.

FIG. 15B depicts an example of an interface 1506B that can be rendered for the same user of FIG. 15A, for the user to view and/or interact with tasks assigned by that user to additional users. In some implementations, the interface 1506B can be rendered responsive to a spoken utterance, of the user, of "show me tasks assigned to me", or similar utterance. For example, the user can be identified based on voice recognition, and tasks that have been assigned to that user by other users, and the interface 1506B rendered based on data for such tasks. The interface 1506B includes descriptions 1580B1 and 1580B2 of respective outstanding tasks. Description 1580B1 indicates a corresponding task ("fix kitchen faucet"), who assigned it ("Susan"), and an indication that a notification of that task has already been provided. Further, it includes a completion element 1581B1, that can be selected to provide an indication of the completion to "Susan", and optionally clear the task from the assigned task queue (e.g., if confirmed by "Susan").

Description 1580B2 indicates a corresponding task ("attend clean-up event"), who assigned it ("Jack"), an indication that a notification of that task has yet to be provided ("not provided"), and an indication of the temporal condition for providing the notification ("Weekend").

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving first voice input, of a first user, that is directed to an automated assistant interface;
   determining, based on processing the first voice input, that:
   the first voice input comprises a task, and
   the first voice input assigns the task to at least a second user and a third user;
   determining, based on checking an access control list, that the first user has appropriate access rights to assign tasks to the second user and has appropriate access rights to assign tasks to the third user;
   in response to determining that the first voice input assigns the task to the second user and the third user, and in response to determining that the first user has appropriate access rights to assign tasks to the second user and the third user:
   causing a second client device, of the second user, to render a second user task assignment notification that conveys that the first user has assigned the task to the second user without conveying one or more details of the task assigned to the second user, and
   causing a third client device, of the third user, to render a third user task assignment notification that conveys that the first user has assigned the task to the third user without conveying the one or more details of the task assigned to the third user;
   in response to determining presence of the second user near the second client device:
   causing the second client device to render a second user task detail notification of the task that conveys the one or more details of the task assigned to the second user; and
   in response to determining presence of the third user near the third client device:
   causing the third client device to render a third user task detail notification of the task that conveys the one or more details of the task assigned to the third user.

2. The method of claim 1,
wherein determining that the second user is present near the second client device is based on the second client device locally verifying that the second user is present in vision data captured by a vision sensor of the second client device and/or locally verifying that a voice signature of the second user is present in audio data captured by one or more microphones of the second client device, and
wherein determining that the third user is present near the third client device is based on the third client device locally verifying that the third user is present in vision data captured by a vision sensor of the third client device and/or locally verifying that a voice signature of the third user is present in audio data captured by one or more microphones of the third client device.

3. The method of claim 2, further comprising:
determining, based on processing the first voice input, that the first voice input specifies a temporal condition for notifying the second user and the third user of the task, wherein the temporal condition comprises a particular day and/or a time range;
wherein causing the second client device to render the second user task detail notification of the task is in response to determining presence of the second user near the second client device on the particular day and/or within the time range; and
wherein causing the third client device to render the third user task detail notification of the task is in response to determining presence of the third user near the third client device on the particular day and/or within the time range.

4. The method of claim 1,
wherein the second user task detail notification of the task includes an alias of the second user, and lacks any alias of the third user; and
wherein the third user task detail notification of the task includes an alias of the third user, and lacks any alias of the second user.

5. The method of claim 1,
wherein the second user task assignment notification differs visually and/or audibly from the second user task detail notification of the task that conveys the one or more details of the task assigned to the second user, and
wherein the third user task assignment notification differs visually and/or audibly from the third user task detail notification of the task that conveys the one or more details of the task assigned to the third user.

6. The method of claim 1, wherein determining that the first voice input assigns the task to at least the second user and the third user comprises:
determining, based on processing the first voice input, that the first voice input refers to an alias for both the first user and the second user;
accessing a stored mapping between aliases and users that is personal to the first user; and
determining, based on the mapping, that the first voice input assigns the task to at least the second user and the third user.

7. The method of claim 1,
wherein the second user task assignment notification further conveys an alias of the first user that assigned the task to the second user, and
wherein the third user task assignment notification further conveys the alias of the first user that assigned the task to the third user.

8. A system comprising:
one or more processors; and
memory storing instructions that, when executed, cause the one or more processors to:
receive first voice input, of a first user, that is directed to an automated assistant interface;
determine, based on processing the first voice input, that:
the first voice input comprises a task, and
the first voice input assigns the task to at least a second user and a third user;
determine, based on checking an access control list, that the first user has appropriate access rights to assign tasks to the second user and has appropriate access rights to assign tasks to the third user;
in response to determining that the first voice input assigns the task to the second user and the third user, and in response to determining that the first user has appropriate access rights to assign tasks to the second user and the third user:
cause a second client device, of the second user, to render a second user task assignment notification that conveys that the first user has assigned the task to the second user without conveying one or more details of the task assigned to the second user, and
cause a third client device, of the third user, to render a third user task assignment notification that conveys that the first user has assigned the task to the third user without conveying the one or more details of the task assigned to the third user;

in response to determining presence of the second user near the second client device:
cause the second client device to render a second user task detail notification of the task that conveys the one or more details of the task assigned to the second user; and
in response to determining presence of the third user near the third client device:
cause the third client device to render a third user task detail notification of the task that conveys the one or more details of the task assigned to the third user.

9. The system of claim 8,
wherein determining that the second user is present near the second client device is based on the second client device locally verifying that the second user is present in vision data captured by a vision sensor of the second client device and/or locally verifying that a voice signature of the second user is present in audio data captured by one or more microphones of the second client device, and
wherein determining that the third user is present near the third client device is based on the third client device locally verifying that the third user is present in vision data captured by a vision sensor of the third client device and/or locally verifying that a voice signature of the third user is present in audio data captured by one or more microphones of the third client device.

10. The system of claim 9, wherein the instructions further cause the one or more processors to:
determine, based on processing the first voice input, that the first voice input specifies a temporal condition for notifying the second user and the third user of the task, wherein the temporal condition comprises a particular day and/or a time range;
wherein causing the second client device to render the second user task detail notification of the task is in response to determining presence of the second user near the second client device on the particular day and/or within the time range; and
wherein causing the third client device to render the third user task detail notification of the task is in response to determining presence of the third user near the third client device on the particular day and/or within the time range.

11. The system of claim 8,
wherein the second user task detail notification of the task includes an alias of the second user, and lacks any alias of the third user; and
wherein the third user task detail notification of the task includes an alias of the third user, and lacks any alias of the second user.

12. The system of claim 8,
wherein the second user task assignment notification differs visually and/or audibly from the second user task detail notification of the task that conveys the one or more details of the task assigned to the second user, and
wherein the third user task assignment notification differs visually and/or audibly from the third user task detail notification of the task that conveys the one or more details of the task assigned to the third user.

13. The system of claim 8, wherein the instructions to determine that the first voice input assigns the task to at least the second user and the third user comprise instructions to:

determine, based on processing the first voice input, that the first voice input refers to an alias for both the first user and the second user;

access a stored mapping between aliases and users that is personal to the first user; and determine, based on the mapping, that the first voice input assigns the task to at least the second user and the third user.

14. The system of claim 8, wherein the second user task assignment notification further conveys an alias of the first user that assigned the task to the second user, and wherein the third user task assignment notification further conveys the alias of the first user that assigned the task to the third user.

15. A non-transitory computer-readable storage medium storing instructions that, when executed, cause one or more processors to perform operations, the operations comprising:

receiving first voice input, of a first user, that is directed to an automated assistant interface;

determining, based on processing the first voice input, that:
the first voice input comprises a task, and
the first voice input assigns the task to at least a second user and a third user;

determining, based on checking an access control list, that the first user has appropriate access rights to assign tasks to the second user and has appropriate access rights to assign tasks to the third user;

in response to determining that the first voice input assigns the task to the second user and the third user, and in response to determining that the first user has appropriate access rights to assign tasks to the second user and the third user:

causing a second client device, of the second user, to render a second user task assignment notification that conveys that the first user has assigned the task to the second user without conveying one or more details of the task assigned to the second user, and causing a third client device, of the third user, to render a third user task assignment notification that conveys that the first user has assigned the task to the third user without conveying the one or more details of the task assigned to the third user;

in response to determining presence of the second user near the second client device:

causing the second client device to render a second user task detail notification of the task that conveys the one or more details of the task assigned to the second user; and in response to determining presence of the third user near the third client device:

causing the third client device to render a third user task detail notification of the task that conveys the one or more details of the task assigned to the third user.

16. The non-transitory computer-readable storage medium of claim 15, wherein determining that the second user is present near the second client device is based on the second client device locally verifying that the second user is present in vision data captured by a vision sensor of the second client device and/or locally verifying that a voice signature of the second user is present in audio data captured by one or more microphones of the second client device, and wherein determining that the third user is present near the third client device is based on the third client device locally verifying that the third user is present in vision data captured by a vision sensor of the third client device and/or locally verifying that a voice signature of the third user is present in audio data captured by one or more microphones of the third client device.

17. The non-transitory computer-readable storage medium of claim 16, the operations further comprising:

determining, based on processing the first voice input, that the first voice input specifies a temporal condition for notifying the second user and the third user of the task, wherein the temporal condition comprises a particular day and/or a time range;

wherein causing the second client device to render the second user task detail notification of the task is in response to determining presence of the second user near the second client device on the particular day and/or within the time range; and wherein causing the third client device to render the third user task detail notification of the task is in response to determining presence of the third user near the third client device on the particular day and/or within the time range.

18. The non-transitory computer-readable storage medium of claim 15, wherein the second user task detail notification of the task includes an alias of the second user, and lacks any alias of the third user; and wherein the third user task detail notification of the task includes an alias of the third user, and lacks any alias of the second user.

19. The non-transitory computer-readable storage medium of claim 15, wherein the second user task assignment notification differs visually and/or audibly from the second user task detail notification of the task that conveys the one or more details of the task assigned to the second user, and wherein the third user task assignment notification differs visually and/or audibly from the third user task detail notification of the task that conveys the one or more details of the task assigned to the third user.

20. The non-transitory computer-readable storage medium of claim 15, wherein determining that the first voice input assigns the task to at least the second user and the third user comprises:

determining, based on processing the first voice input, that the first voice input refers to an alias for both the first user and the second user;

accessing a stored mapping between aliases and users that is personal to the first user; and determining, based on the mapping, that the first voice input assigns the task to at least the second user and the third user.

\* \* \* \* \*